US012574861B2

(12) United States Patent　　　　(10) Patent No.:　US 12,574,861 B2
Lau et al.　　　　　　　　　　　　　(45) Date of Patent:　Mar. 10, 2026

(54) METHOD AND SYSTEM FOR ACCELERATING DISTRIBUTED PRINCIPAL COMPONENTS WITH NOISY CHANNELS

(71) Applicant: The Hong Kong University of Science and Technology, Kowloon (HK)

(72) Inventors: Vincent Kin Nang Lau, New Territories (HK); Zezhong Zhang, Shenzhen (CN); Kaibin Huang, New Territories (HK)

(73) Assignee: The Hong Kong University of Science and Technology, Kowloon (HK)

( * ) Notice: Subject to any disclaimer, the term of this patent is extended or adjusted under 35 U.S.C. 154(b) by 869 days.

(21) Appl. No.: 17/662,696

(22) Filed: May 10, 2022

(65) Prior Publication Data

US 2022/0394629 A1　　Dec. 8, 2022

Related U.S. Application Data

(60) Provisional application No. 63/193,042, filed on May 25, 2021.

(51) Int. Cl.
H04W 52/36　　　　(2009.01)
H04L 5/00　　　　(2006.01)

(52) U.S. Cl.
CPC ............. H04W 52/36 (2013.01); H04L 5/006 (2013.01); H04L 5/0073 (2013.01)

(58) Field of Classification Search
CPC ....... H04W 52/36; H04L 5/006; H04L 5/0073
(Continued)

(56) References Cited

U.S. PATENT DOCUMENTS 10,922,620 B2　2/2021　Mytkowicz et al.
2018/0013681 A1　1/2018　Kohout et al.
(Continued)

FOREIGN PATENT DOCUMENTS

CN　　109359150　　2/2019
CN　　109379120 A　2/2019
(Continued)

OTHER PUBLICATIONS

Jialin Dong, Student Member, IEEE, Yuanming Shi, Member, IEEE, and Zhi Ding, Fellow, IEEE; Blind Over-the-Air Computation and Data Fusion via Provable Wirtinger Flow; arXiv:1811.04644v1; Nov. 12, 2018; (Year: 2018).*

(Continued)

*Primary Examiner* — David Yi
*Assistant Examiner* — Paul Coleman
(74) *Attorney, Agent, or Firm* — Amin, Turocy & Watson, LLP

(57) ABSTRACT

The described technology is generally directed towards accelerating distributed principal components in the presence of noisy channels. A federated training based method is disclosed. The method can calculate a desired common subspace for edge devices under the coordination of a server. The server can be connected to the edge devices via noisy wireless channels. A broadband communication system can be used, wherein devices can transmit local gradients by linear analog modulation over sub-channels in communication rounds for over-the-air aggregation. Before each communication round, the server can detect information of a current region. Based on the region information, an online region-adaptive power control scheme can be applied to accelerate the process.

20 Claims, 15 Drawing Sheets

902 Receiving, by a first device, an updated matrix from a server, wherein the first device is a participant in a federated principal components analysis.

904 Determining, by the first device, a local gradient with respect to the updated matrix, wherein the local gradient is based on local data stored at the first device.

906 Modulating, by the first device, the local gradient using linear analog modulation, resulting in a modulated local gradient.

908 Adjusting, by the first device, a transmission power, resulting in an adjusted transmission power.

910 Receiving, by the first device, synchronization information to synchronize a first wireless signal with a second wireless signal.

912 Sending, by the first device, the modulated local gradient to the server via the first wireless signal, wherein the first wireless signal comprises the adjusted transmission power, and wherein the first wireless signal is synchronized with the second wireless signal sent by a second device.

(58) Field of Classification Search

USPC .......................................................... 706/12

See application file for complete search history.

(56) References Cited

U.S. PATENT DOCUMENTS

| | | | |
|---|---|---|---|
| 2018/0365582 A1 | 12/2018 | Musuvathi et al. | |
| 2023/0413070 A1* | 12/2023 | Li | G06N 3/09 |

FOREIGN PATENT DOCUMENTS

| | | |
|---|---|---|
| CN | 109471850 | 3/2019 |
| CN | 111737749 A | 10/2020 |
| CN | 112232359 A | 1/2021 |

OTHER PUBLICATIONS

Jialin Dong, Blind Over-the-Air Computation and Data Fusion via Provable Wirtinger Flow, Nov. 12, 2018, arXiv:1811.04644v1 (Year: 2018).*

Gafni et al., "Federated Learning: A Signal Processing Perspective," arXiv:2103.17150v1 [ eess.SP] Mar. 31, 2021, 25 pages.

Narayanamurthy et al., "Federated Over-the-Air Subspace Learning and Tracking from Incomplete Data," arXiv:2002.12873v2 [cs.LG] Jun. 14, 2020, 33 pages.

Ni et al., "Integrating Over-the-Air Federated Learning and Non-Orthogonal Multiple Access: What Role can RIS Play?" arXiv:2103.00435v1 [cs.IT] Feb. 28, 2021, 14 pages.

Wang et al., "Optimizing Federated Learning on Non-IID Data with Reinforcement Learning," IEEE Infocom 2020—EEE Conference on Computer Communications, Jul. 1, 2020, 10 pages.

Sery et al., "Over-the-Air Federated Learning from Heterogeneous Data," arXiv:2009.12787v2 [cs.LG] Oct. 2, 2020, 15 pages.

Abdi et al., "Principal component analysis," Wiley Interdiscip. Rev. Comput. Stat., vol. 2, No. 4, pp. 433-459, Jul. 15, 2010, 27 pages.

Wang et al., "PCA-Based Channel Estimation and Tracking for Massive MIMO Systems With Uniform Rectangular Arrays," IEEE Trans. Wireless Commun., vol. 19, pp. 6786-6797, Oct. 2020, 13 pages.

Belhumeur et al., "Eigenfaces vs. Fisherfaces: Recognition Using Class Specific Linear Projection," IEEE Trans. Pattern Anal. Mach. Intell., vol. 19, pp. 711-720, Jul. 1997, 10 pages.

Zhu et al., "Broadband Analog Aggregation for Low-Latency Federated Edge Learning (Extended Version)," arXiv:1812.11494v3 [cs.IT] Jan. 16, 2019, 30 pages.

Zhu et al., "MIMO Over-the-Air Computation for High-Mobility Multi-Modal Sensing," arXiv:1803.11129v2 [cs.IT] Jul. 12, 2018, 14 pages.

Mcmahan et al., "Communication-efficient learning of deep networks from decentralized data," in Proc. Int. Conf. Artif. Int. Statist. (AISTATS), pp. 1273-1282, 2017, 10 pages.

Grammenos et al., "Federated Principal Component Analysis," arXiv:1907.08059v3 [cs.LG] Oct. 22, 2020, 36 pages.

Fan et al., "Distributed estimation of principal eigenspaces," arXiv:1702.06488v4 [stat.CO] Jan. 10, 2018, 47 pages.

Balcan et al., "Improved Distributed Principal Component Analysis," in Proc. Conf. Neural Inf. Process. Syst. (NIPS), vol. 27, 2014, 9 pages.

Friedlander et al., "Erratum: Hybrid deterministic-stochastic methods for data fitting," SIAM J. Sci. Comput., vol. 35, No. 4, pp. B950-B951, 2013, 2 pages.

Yang et al., "Projection approximation subspace tracking," IEEE Trans. Signal Process., vol. 43, pp. 95-107, Jan. 1995, 13 pages.

Zhang et al., "Turning Channel Noise into an Accelerator for Over-the-Air Principal Component Analysis," arXiv:2104.10095v3 [cs.IT] Apr. 1, 2022, 16 pages.

Wold et al., "Principal Component Analysis," Chemometrics and Intelligent Laboratory Systems, 2 (1987) 37-52, 16 pages.

Iwen et al., "A Distributed and Incremental SVD Algorithm for Agglomerative Data Analysis on Large Networks," Siam J. Matrix Anal. Appl, vol. 37, No. 4, pp. 1699-1718, 20 pages.

"Kxwfspz / AirPCA," Github, https://github.com/Kxwfspz/AirPCA, accessed Apr. 20, 2022, 1 page.

Narayanamurthy et al., "Federated Over-Air Subspace Tracking from Incomplete and Corrupted Data," arXiv:2002.12873v3 [cs.LG] Jun. 22, 2021, 41 pages.

Ni et al., "Integrating Over-the-Air Federated Learning and Non-Orthogonal Multiple Access: What Role can RIS Play?" arXiv:2103.00435v1 [cs.IT] Feb. 28, 2021, 15 pages.

Lim et al., "Federated learning in mobile edge networks : a comprehensive survey," IEEE Communications Surveys and Tutorials, 22(3), 2031-2063, 34 pages.

Sun et al., "Principal Component Analysis-Based Broadband Hybrid Precoding for Millimeter-Wave Massive MIMO Systems," IEEE Transactions on Wireless Communications (vol. 19, Issue: 10, Oct. 2020), 16 pages.

Bartlett et al., "Face Recognition by Independent Component Analysis," IEEE Trans Neural Netw. 2002 ; 13(6): 1450-1464, 42 pages.

Zhu et al., "MIMO Over-the-Air Computation for High-Mobility Multi-Modal Sensing," IEEE Internet of Things Journal (vol. 6, Issue: 4, Aug. 2019), 14 pages.

Oja et al., "On stochastic approximation of the eigenvectors and eigenvalues of the expectation of a random matrix," J. Math. Anal. Appl., vol. 106, No. 1, pp. 69-84, 1985, 16 pages.

Chen et al., "A Joint Learning and Communications Framework for Federated Learning over Wireless Networks," IEEE Transactions on Wireless Communications ( vol. 20, Issue: 1, Jan. 2021), 14 pages.

Yang et al., "Scheduling Policies for Federated Learning in Wireless Networks," arXiv:1908.06287v2 [cs.IT] Oct. 9, 2019, 16 pages.

Du et al., "High-Dimensional Stochastic Gradient Quantization for Communication-Efficient Edge Learning," IEEE Transactions on Signal Processing (vol. 68), pp. 2128-2142, Mar. 2020, 15 pages.

Shlezinger et al., "UVeQFed: Universal Vector Quantization for Federated Learning," IEEE Transactions on Signal Processing, vol. 69, 2021, 15 pages.

Luo et al., "HFEL: Joint Edge Association and Resource Allocation for Cost-Efficient Hierarchical Federated Edge Learning," IEEE Transactions on Wireless Communications ( vol. 19, Issue: 10, Oct. 2020), 14 pages.

Yang et al., "Energy Efficient Federated Learning Over Wireless Communication Networks," IEEE Transactions on Wireless Communications ( vol. 20, Issue: 3, Mar. 2021), pp. 1935-1949, 15 pages.

Zeng et al., "Energy-Efficient Resource Management for Federated Edge Learning With CPU-GPU Heterogeneous Computing," arXiv:2007.07122v2 [cs.IT] Jul. 15, 2020, 35 pages.

Mo et al., "Energy-Efficient Federated Edge Learning with Joint Communication and Computation Design," Journal of Communications and Information Networks, vol. 6, No. 2, Jun. 2021, 15 pages.

Zhai et al., "Hybrid Beamforming for Massive MIMO Over-the-Air Computation," IEEE Transactions on Communications, vol. 69, No. 4, Apr. 2021, 15 pages.

Zhang et al., "Gradient Statistics Aware Power Control for Over-the-Air Federated Learning," IEEE Trans. Wireless Commun., vol. 20, pp. 5115-5128, Aug. 2021, 14 pages.

Samarakoon et al., "Distributed Federated Learning for Ultra-Reliable Low-Latency Vehicular Communications," IEEE Transactions on Communications (vol. 68, Issue: 2, Feb. 2020), 14 pages.

Amiri et al., "Federated Learning Over Wireless Fading Channels," IEEE Transactions on Wireless Communications, vol. 19, No. 5, May 2020, 12 pages.

Yang et al., "Federated Learning via Over-the-Air Computation," IEEE Trans. Wireless Commun., vol. 19, pp. 2022-2035, Mar. 2020, 14 pages.

Liu et al., "Privacy for Free: Wireless Federated Learning via Uncoded Transmission With Adaptive Power Control," IEEE Journal on Selected Areas in Communications, vol. 39, Issue 1, Jan. 2021, 16 pages.

(56) References Cited

OTHER PUBLICATIONS

Ge et al., "Escaping From Saddle Points—Online Stochastic Gradient for Tensor Decomposition," JMLR: Workshop and Conference Proceedings, vol. 40:1-46, 2015, 46 pages.

Zhu et al., "One-Bit Over-the-Air Aggregation for Communication-Efficient Federated Edge Learning: Design and Convergence Analysis," IEEE Transactions on Wireless Communications, vol. 20, No. 3, Mar. 2021, 16 pages.

Lin et al., "Deploying Federated Learning in Large-Scale Cellular Networks: Spatial Convergence Analysis," arXiv:2103.06056v1 [cs.IT] Mar. 10, 2021, 30 pages.

Jin et al., "How to escape saddle points efficiently," in Proc. Intl. Conf. Mach. Learning (ICML), pp. 1724-1732, 2017, 9 pages.

Mertikopoulos et al., "On the almost sure convergence of stochastic gradient descent in non-convex problems," In Proc. Conf. Neural Inf. Process. Syst. (NIPS), pp. 1117-1128, 2020, 12 pages.

Bertsekas et al., "Neuro-Dynamic Programming," Springer, Boston, MA, 2008, pp. 1-129, 143 pages.

First Office Action received for Chinese Patent Application Serial No. 202210575990.6 dated Dec. 11, 2024, 14 pages(Including English Translation).

* cited by examiner

Non-Stationary Region R_ns

Saddle Region R_sa

Global Optimum Region R_op

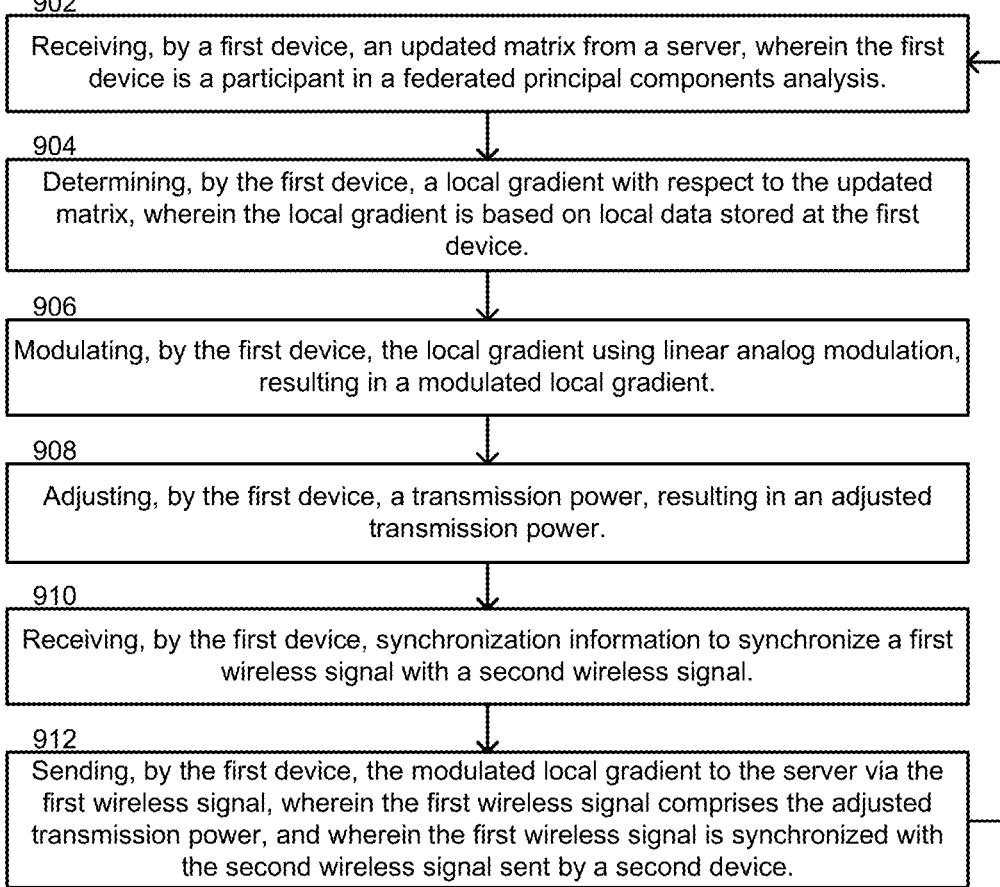

902
Receiving, by a first device, an updated matrix from a server, wherein the first device is a participant in a federated principal components analysis.

904
Determining, by the first device, a local gradient with respect to the updated matrix, wherein the local gradient is based on local data stored at the first device.

906
Modulating, by the first device, the local gradient using linear analog modulation, resulting in a modulated local gradient.

908
Adjusting, by the first device, a transmission power, resulting in an adjusted transmission power.

910
Receiving, by the first device, synchronization information to synchronize a first wireless signal with a second wireless signal.

912
Sending, by the first device, the modulated local gradient to the server via the first wireless signal, wherein the first wireless signal comprises the adjusted transmission power, and wherein the first wireless signal is synchronized with the second wireless signal sent by a second device.

FIG. 9

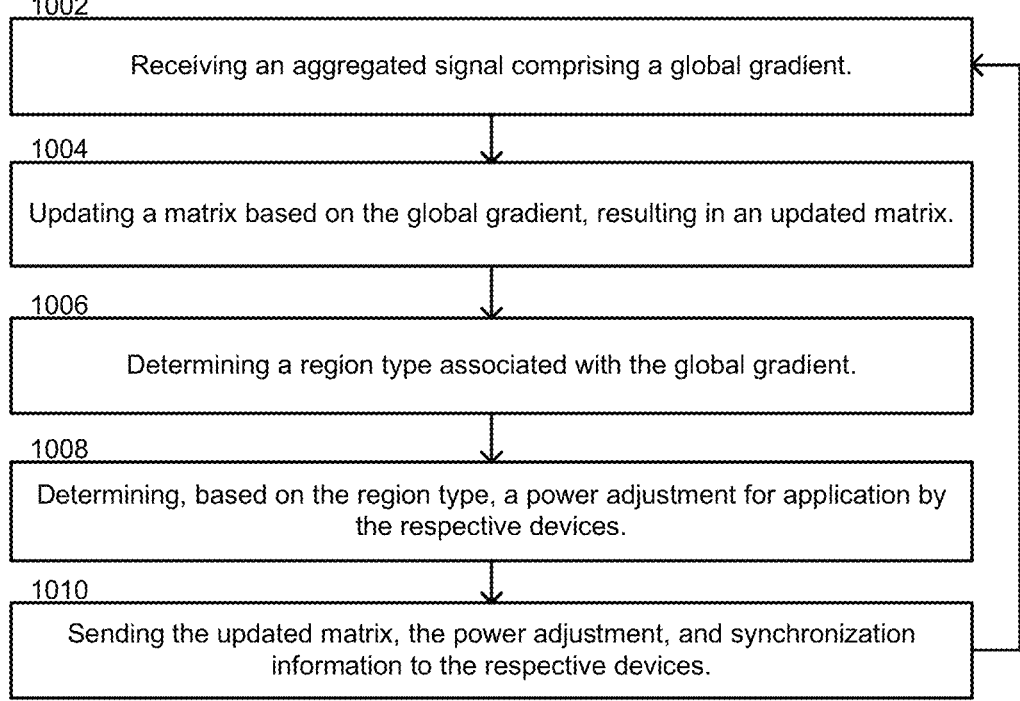

1002

Receiving an aggregated signal comprising a global gradient.

1004

Updating a matrix based on the global gradient, resulting in an updated matrix.

1006

Determining a region type associated with the global gradient.

1008

Determining, based on the region type, a power adjustment for application by the respective devices.

1010

Sending the updated matrix, the power adjustment, and synchronization information to the respective devices.

FIG. 10

METHOD AND SYSTEM FOR ACCELERATING DISTRIBUTED PRINCIPAL COMPONENTS WITH NOISY CHANNELS

CROSS REFERENCE TO RELATED APPLICATION

This is a nonprovisional claiming priority under 35 U.S.C. § 119 of U.S. Provisional Patent Application No. 63/193,042, filed on May 25, 2021, entitled "Method and system for accelerating distributed principal components with noisy channels", the entirety of which prior application is hereby incorporated by reference herein.

TECHNICAL FIELD

The following description relates generally to principal component analysis (PCA) techniques applicable in the context of networked computing devices, in particular, to PCA techniques for calculating a low-dimensional subspace for data distributed over edge devices connected to a network.

BACKGROUND

In recent years, the enormous data distributed over edge devices such as smartphones, internet-of-things (IoT) sensors, and a wide variety of other devices, and ubiquitous connectivity have triggered a paradigm shift towards distributed machine learning and large-scale data analytics.

Principal component analysis (PCA), a standard technique in data analytics, provides a simple way of discovering a low-dimensional subspace, called principal components, that minimizes the information loss of a high-dimensional dataset. This is useful for data compression, simplification and feature extraction. For these reasons, PCA finds applications in almost all scientific fields, ranging from wireless communication to machine learning.

A common approach of PCA is based on singular-value decomposition (SVD) of a data table, which comprises all data samples as rows. However, the required data centralization makes this approach infeasible for implementing PCA in a mobile network as uploading mobile data violates their privacy.

The above-described background is merely intended to provide a contextual overview of some current issues and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 9 is a flow diagram representing example operations of a device that participates in a federated principal components analysis, in accordance with various aspects and embodiments of the subject disclosure.

FIG. 10 is a flow diagram representing example operations of a server that participates in a federated principal components analysis, in accordance with various aspects and embodiments of the subject disclosure.

DETAILED DESCRIPTION

Figure 1:
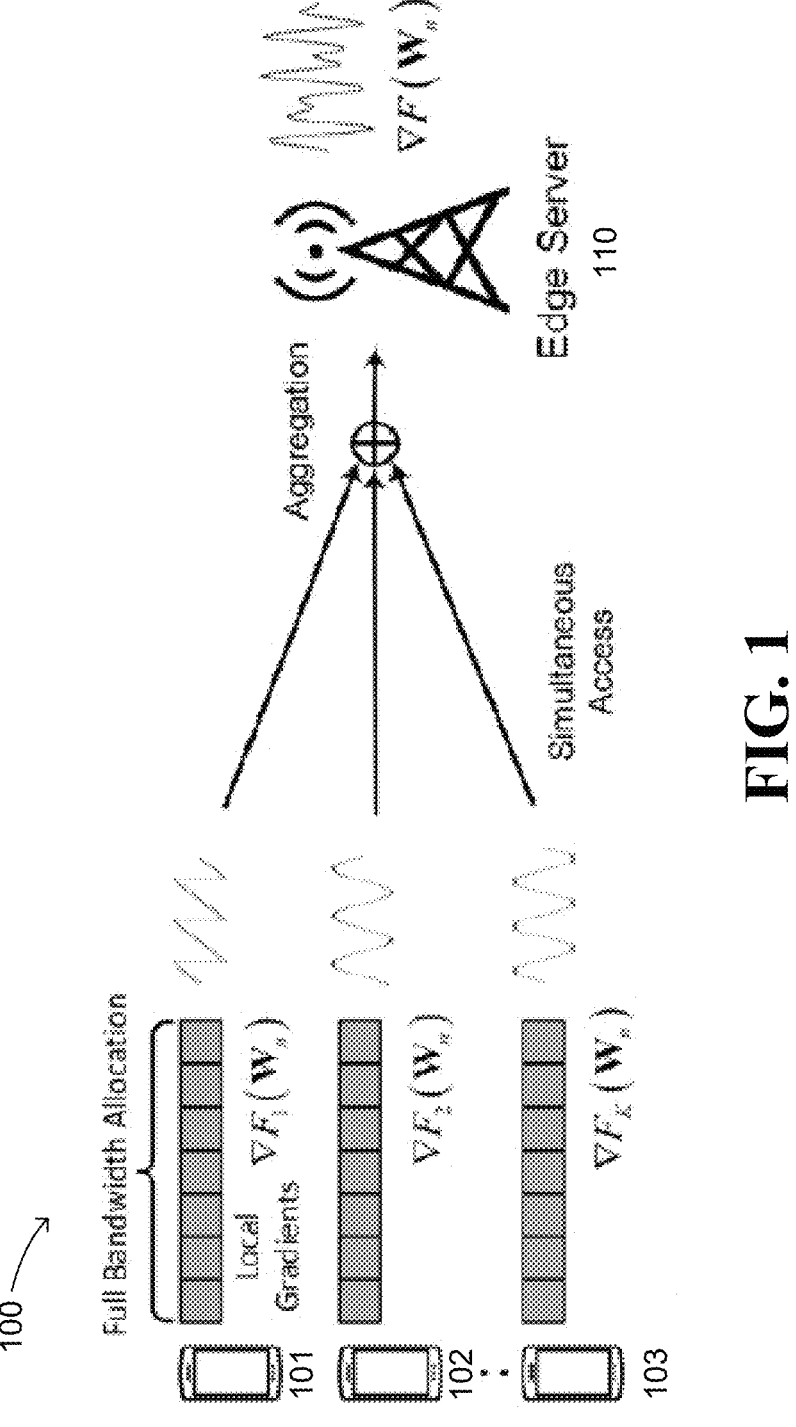
FIG. 1 illustrates an example architecture of an AirPCA system, in accordance with one or more embodiments described herein.

Various aspects or features of this disclosure are described with reference to the drawings, wherein like reference numerals are used to refer to like elements throughout. In this specification, for purposes of explanation, numerous specific details are set forth in order to provide a thorough understanding of the subject disclosure. It should be understood, however, that certain aspects of this disclosure may be practiced without these specific details, or with other methods, components, materials, and so on. In other instances, well-known structures and devices are shown in block diagram form to facilitate describing the subject disclosure.

One or more aspects of the technology described herein are generally directed towards an efficient design of federated PCA in a wireless system based on over-the-air federated learning (FL) which exploits the waveform-superposition property of a multi-access channel to realize low-latency over the air aggregation. The design is referred to herein as over the air PCA, or "AirPCA". Furthermore, a power-control scheme is disclosed which adapts transmission power of devices to stochastic gradient descent (SGD) such that channel noise is turned into an accelerator for the descent.

FL techniques can be used to preserve data privacy to implement distributed PCA, also referred to as federated PCA. Federated PCA can help compress and simplify the data distributed at the network edge, e.g., data generated by vehicular sensing or augmented reality/virtual reality (AR/VR) applications and collected by different devices, for convenient storage and their further use in edge learning.

FL frameworks involve devices in updating a prediction model. Each device can use local data to generate local updates, and the local updates (instead of data) can be sent to a server. The server can aggregate the updates and update a global model. In this way, data privacy is preserved.

Federated learning can also protect data ownership of devices by avoiding uploads of raw data, while providing a mechanism to leverage distributed mobile data. A server can request each device to upload updates for a global model which is computed using local training data. The updates do not directly expose the content of local data and contain much less information than the local data, so the users' data ownership is protected.

In a "one-shot method", federated PCA can involve devices in computing their estimates of principal components via SVD of their local data and uploading their local estimates to a server for aggregation to obtain the global estimate. A drawback of the one-shot method is that sharing the local principal components raises data privacy concerns. Furthermore, uploading full-SVD results leads to high communication latency when the number of devices grows large. By moderately reducing the dimensionality of the local subspace estimates, the communication latency issue can be alleviated. However, the dimension reduction on local subspace estimates results in a biased error, which distorts the global estimate when the local datasets are highly non-independent and identically distributed.

Another solution to federated PCA is to apply the power method, which can be integrated with over the air aggregation to provide fast convergence and negligible communication latency. However, the power method is sensitive to noise perturbation, making it infeasible in a wireless network, especially when the signal to noise ratio (SNR) is low.

Embodiments of this disclosure can apply SGD-based processing to solving federated PCA as an optimization problem of finding a subspace (principal components) to minimize the error function for data compression by projection onto the subspace. In the context of federated PCA, a difficulty in applying SGD arises from the unitary/orthogonal constraint of the optimization variable that is a subspace, which makes the optimization problem indecomposable. FL cannot be directly applied for indecomposable optimization problems. The difficulty can be overcome using the finding that the solution to the unconstrained problem without the unitary/orthogonal constraint also solves the original constrained problem.

Embodiments of this disclosure can leverage the observation that the SGD method is robust against channel noise. Moreover, with the presence of channel noise, the SGD method can guarantee convergence to the global optimum, and so the SGD method improves upon the power method. Moreover, by adopting over-the-air aggregation in the gradient uploading phase, communication latency issue can also be addressed, and so the disclosed SGD approach can outperform one-shot methods, particularly when the number of devices is large.

In a scenario with many devices and high-dimensional data, the uploading of local model updates from devices can cause a communication bottleneck for FL (including federated PCA). A variety of techniques have emerged to overcome the bottleneck, including source encoding and resource management. Over-the-air FL is a class of techniques that realize over-the-air aggregation by superimposing analog modulated model updates transmitted simultaneously by devices. Compared with digital orthogonal access, over-the-air aggregation supporting simultaneous access has the advantage of reducing the multiaccess latency when the number of devices is large.

However, the uncoded analog transmissions used in over-the-air FL can expose the receive signals to the perturbation of channel noise that can potentially degrade the learning performance. Embodiments of this disclosure can turn this drawback into an advantage for AirPCA by exploiting the characteristics of an error function for AirPCA.

For training a model (e.g., a deep neural network) using FL, the (prediction) loss function is dataset dependent and has no known expression. In contrast, the PCA error function is well defined and its theoretical properties are well understood. The PCA error function has a finite number of stationary points comprising a global optimum and a number of discrete saddle points.

Consequently, the regions along the descent path belong to one of the three types: 1) a saddle region centered at an associated saddle point, 2) a non-stationary region with relatively large slopes, and 3) an optimum region centered at the global optimal point. The properties suggest that the gradient descent can be trapped at a saddle point having a zero gradient if the descent path encounters a saddle region. One solution is to add artificial noise to gradients to escape from saddle points. On the other hand, the noise slows down the descent outside saddle regions and reduces the convergence accuracy. Instead of adding artificial noise, embodiments of this disclosure can leverage channel noise existing in received signals in AirPCA to help escape from saddle points, by amplifying its effect in saddle regions but reducing its effect in other types of regions on the descent path.

Embodiments can leverage noise by designing region adaptive power control for AirPCA. To accomplish region adaptive power control, a descent-speed analysis can be performed. Embodiments can apply a framework of descent-speed analysis for AirPCA that builds on a martingale-based analytical approach for centralized PCA training. The framework can account for wireless propagation and techniques, including orthogonal frequency division multiplexing (OFDM), over-the-air aggregation, channel fading and noise.

The descent speed of AirPCA can be measured by the reduction of the expected error function over a given number of communication rounds. Using the framework and exploiting the mentioned properties of the error function, the descent speeds in different regions on a descent path can be characterized mathematically.

Consider the gradient descent in a non-stationary region. A lower bound on the descent speed can be derived and shown to be a monotone increasing function of the expected receive signal-to-noise ratio (SNR), which can be uniform for all devices as a result of signal-magnitude alignment in over-the-air aggregation, and also the expected number of active devices in the presence of fading.

In contrast, the descent speed in a saddle region is a monotone decreasing function of these two variables, as their reduction amplifies the noise effect and accelerates the escape from the saddle point. Last, under the effect of channel noise, the descent path can eventually enter the optimum region in probability so long as the step-size is sufficiently small.

Based on the analytical result of the descent-speed analysis, a simple scheme for online power control can be designed to adapt the uniform receive SNR to the type of current descent region, by coordinating transmission power of devices. Thereby, the gradient descent of AirPCA is accelerated. When a saddle region is detected, the receive SNR can be fixed at a minimum value to amplify the noise effect so that the descent path can escape from the saddle point. This results in power savings under an average power constraint.

On the other hand, when either a non-stationary or the optimum region is detected, receive SNR is enhanced by either using up all power savings from preceding rounds in the current round, called one-shot saving spending, or distributing the savings over multiple rounds using a diminishing geometric sequence with the common ratio controlling the saving-dissipation speed, called gradual saving spending.

The learning performance of AirPCA can be evaluated using experiments with several well-known real datasets, e.g., a Modified National Institute of Standards and Technology (MNIST) dataset, a Canadian Institute for Advanced Research, 10 classes (CIFAR-10) dataset, and a face image dataset referred to as an AR dataset. The disclosed region-adaptive power control is shown to be effective in escaping from saddle points and accelerating AirPCA convergence. Region-adaptive power control can also achieve the convergence accuracy of centralized PCA. Moreover, it is found that gradual saving spending can outperform one-shot saving spending if the common ratio is optimized. The effects of other parameters such as the number of devices and the channel-truncation threshold can also be investigated.

The below sections of this disclosure are organized as follows. First, an example AirPCA system is described. Next, descent speeds of AirPCA are analyzed. Next, an example design of region-adaptive power control is described. Next, example experimental results are presented. Finally, a general summary and example computing device are described.

Example AirPCA System

FIG. 1 illustrates an example architecture of an AirPCA system, in accordance with one or more embodiments described herein. The example architecture 100 includes devices 101, 102, 103 and an edge server 110. The devices 101, 102, 103 can modulate signals by linear analog modulation, and can transmit simultaneously. The server 110 can receive an aggregated signal (superimposed waveform) over each sub-channel. Since a global gradient is the average of local gradients, the server 110 can directly estimate the global gradient from the aggregated signals.

A. Over-the-Air Aggregation System

The example architecture 100 can comprise a broadband over-the-air aggregation system that supports AirPCA. The example broadband over-the-air aggregation system 100 can comprise K devices (101, 102, ... 103) communicating with a single server 110. The communication can comprise multiple rounds, each of which can be divided into an uplink and a downlink transmission phase.

Figure 2:
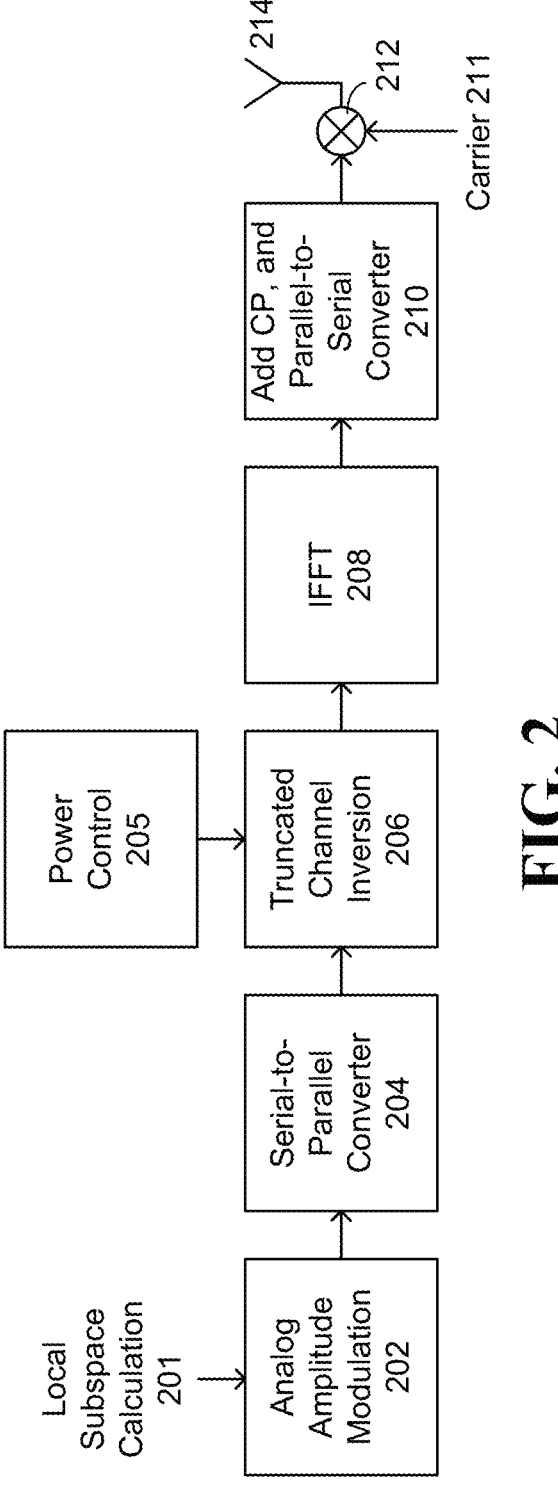
FIG. 2 illustrates an example transmitter design for edge devices, in accordance with one or more embodiments described herein.

FIG. 2 illustrates an example transmitter design for edge devices, in accordance with one or more embodiments described herein. The example transmitter design can be incorporated, e.g., into devices 101, 102, 103 in FIG. 1. The example transmitter design includes local subspace calculation 201, analog amplitude modulation 202, serial-to-parallel converter 204, power control 205, truncated channel inversion 206, Inverse Fast Fourier Transform (IFFT) 208, add CP and parallel to serial converter 210, a mixer 212 that can combine an output from 210 with a carrier 211, and an antenna 214.

6

Figure 3:
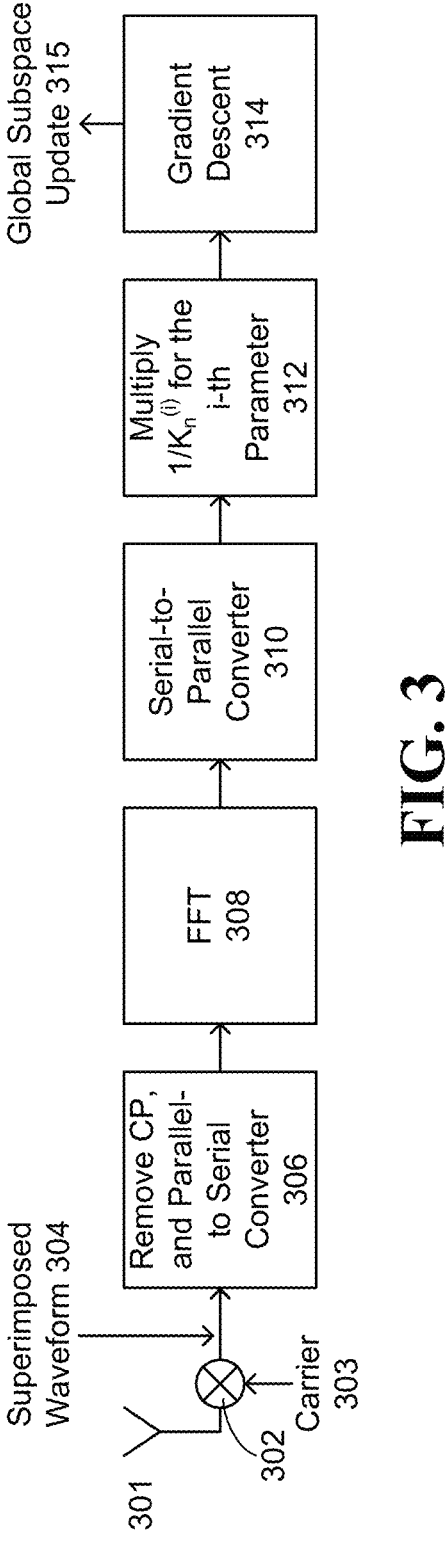
FIG. 3 illustrates an example receiver design for an edge server, in accordance with one or more embodiments described herein.

FIG. 3 illustrates an example receiver design for an edge server, in accordance with one or more embodiments described herein. The example receiver design can be incorporated, e.g., into an edge server 110 such as illustrated in FIG. 1. The example receiver design includes an antenna 301, a mixer/de-mixer 302, a carrier 303, a superimposed waveform 304, a remove CP and parallel to serial converter 306, a Fast Fourier Tranform 308, a serial to parallel converter 310, a multiply $1/K_n^{(i)}$ for the i-th parameter 312, a gradient descent 314, and a global subspace update 315.

With reference to FIG. 1, FIG. 2, and FIG. 3, consider the uplink phase of an arbitrary round. Each device 101, 102, 103 transmits a fixed number, denoted as c, of symbols to the server over M (frequency) sub-channels generated by OFDM. To this end, c symbols are divided into c/M blocks. Each block is transmitted in one OFDM symbol duration with each sub-channel modulated with one symbol using linear analog modulation. The transmission of all devices is simultaneous so as to realize over-the-air aggregation. Then the i-th aggregated symbol received by the server in the n-th communication round, denoted as $y_n^{(i)}$, is given as $$y_n^{(i)} = \sum_{k=1}^{K} h_{k,n}^{(i)} p_{k,n}^{(i)} s_{k,n}^{(i)} + z_n^{(i)}, \ 1 \le i \le M, n \ge 1, \tag{1}$$

where $s_{k,n}^{(i)}$ denotes the symbol transmitted by device k, with $$E[|s_k^{(i)}|^2] = 1,$$

the Gaussian random variables $h_{k,n}^{(i)} \sim \mathcal{CN}(0,1)$ and $z_n^{(i)} \sim \mathcal{CN}(0, \sigma^2)$ represent the gain and noise of the corresponding sub-channel, respectively, and $p_{k,n}^{(l)}$ is the precoding coefficient. Let $P_{k,n}$ denote the power consumption by the broadband transmission of device k in round n:

$$P_{k,n} = \sum_{i=1}^{M} |p_{k,n}^{(i)}|^2$$

The transmission of each device 101, 102, 103 can be subject to an average power constraint:

$$E[P_{k,n}] = E\left[\sum_{i=1}^{M} |p_{k,n}^{(i)}|^2\right] \le \bar{P}. \tag{2}$$

for a given constant P.

Over-the-air aggregation requires channel inversion so that each received symbol is the desired sum of transmitted symbols. Embodiments can adopt an existing scheme that is designed to satisfy the average power constraint called truncated channel inversion. The design of truncated channel inversion 206 in FIG. 2 can support signal alignment at the receiver of FIG. 3. The precoding coefficient in equation (2) can be given as:

$$p_{k,n}^{(i)} = \begin{cases} \frac{\sqrt{P_n^{rx}}}{h_{k,n}^{(i)}}, & |h_{k,n}^{(i)}|^2 \ge G, \\ 0, & |h_{k,n}^{(i)}|^2 < G, \end{cases} \tag{3}$$

where the controllable receive power $P_n^{rx}$ and constant G are called signal-magnitude-alignment factor and truncation threshold, respectively, as explained in the following. The factor $P_n^{rx}$, which scales magnitude of an aggregated symbol at the receiver, forms a power-control sequence $\{P_n^{rx}\}$ in the entire process controlling the receive power under the constraint in equation (3). Given identical distributions of sub-channel gains, it can be obtained that:

$$E[P_n^{rx}] \le \frac{\overline{P}}{MEi(G)} = \overline{P}_{max}^{rx}, \qquad (4)$$

where $$Ei(G) \triangleq \int_G^\infty \frac{1}{t}\exp(-t)dt \qquad (15)$$

is the exponential integral function. On the other hand, the truncation threshold G avoids excessive power consumption due to inversion of deeply faded sub-channels. To enforce fixed transmission latency, the symbols assigned to truncated sub-channels are discarded. The probability that a sub-channel avoids truncation (or equivalently its symbol is transmitted) is called activation probability and denoted by $\zeta^{act}$. It can be obtained as $$\zeta^{act} = Pr\left(\left|h_{k,n}^{(i)}\right|^2 \ge G\right) = e^{-G} \qquad (5)$$

The value $\zeta^{act}$ reflects the reliability of a wireless channel.

After receiving the aggregated message, the server 110 can update the global model and further broadcasts it in the downlink, which can be identical to all devices 101, 102, 103. As transmit power and bandwidth are usually large for broadcasting, we consider it as the high SNR condition and neglect the distortion during broadcasting in the downlink.

It is possible that some devices 101, 102, 103 disconnect from the server 110 occasionally in practice, which is called as the outage effect. We consider disconnection as a special case of the channel-truncation, where all sub-channels are truncated. Moreover, when a device in outage reconnects to the server 110, it first receives the latest subspace broadcast from the server 110, and then continues to compute the local gradient and joins the AirPCA again.

B. Distributed PCA Problem and Algorithm

1) Distributed PCA Problem: In an example distributed PCA problem, assume a global dataset comprising L samples is uniformly distributed over the K devices. Let $\mathcal{D}_k$ denote local dataset of device k generated by uniformly sampling the global dataset. The local datasets have a uniform size: $|\mathcal{D}_k| = \ell_0$ where $L = K\ell_0$. Assume that the local datasets are acquired in advance and do not vary within the processing duration, which is a common setting. The distributed PCA problem is to find a low-dimensional subspace of the data space, called principal components, to compress the distributed dataset under the criterion of minimum distortion. Let d and D with D>>d denote the dimensions of the principal components and data space, respectively. Let the i-th sample be denoted as $x_i \in \mathbb{R}^{D \times 1}$. Moreover, d-dimensional principal components are represented by the unitary/orthogonal real matrix $W \in \mathbb{R}^{D \times d}$. The sample $x_i$ can be approximated using its projection onto the subspace, $W^T x_i$, as $WW^T x_i$. To minimize the approximation error, the distributed PCA problem can be formulated as:

$$(P1) \min_W \frac{1}{L}\sum_{k=1}^K \sum_{i\in\mathcal{D}_k}\left\|x_i - WW^T x_i\right\|_2^2, \qquad (6)$$

$$s.t. \quad W^T W = I.$$

where $x_i \in \mathbb{R}^{D \times 1}$ is a data sample, with $X \in \mathbb{R}^{D \times L}$ as the aggregation. If all devices can upload their local data to the server, Problem (P1) can be solved by applying SVD on the centralized dataset X=[x1; x2; . . . ; $x_L$]. However, for the distributed PCA scenario, direct data uploading is infeasible under the data-privacy constraint. A different SGD based solution can be used.

2) Distributed PCA Processing: In an example distributed PCA processing technique, for ease of notation, let the objective function of Problem (P1) be denoted as:

$$F(W) = \frac{1}{L}\sum_{i=1}^L\left\|x_i - WW^T x_i\right\|_2^2. \qquad (7)$$

Figures 4A, 4B, 4C:
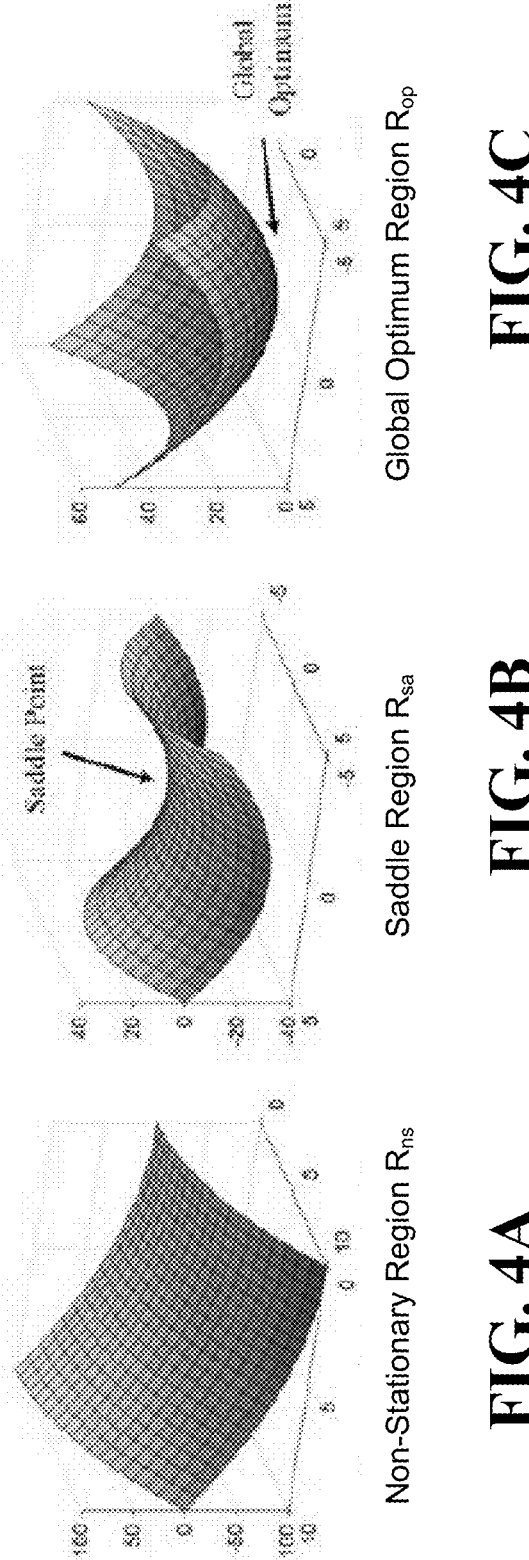
FIGS. 4A, 4B, and 4C illustrate three example types of regions, in accordance with one or more embodiments described herein.

F(W) has stationary points in the form of $W=U_d Q$, where the column vectors of $U_d \in \mathbb{R}^{D \times d}$ are d distinct eigenvectors of the covariance matrix $R=XX^T$ and $Q \in \mathbb{R}^{d \times d}$ is an arbitrary unitary matrix. If the Hessian matrix $\mathcal{H}(W)=\nabla^2 F(W)$ has both positive and negative eigenvalues, then W is called a saddle point. All stationary points of F(W) are saddle points, except for one where $U_d$ contains the d dominant eigenvectors of R. This point yields the global minimum of F(W). The above properties suggest that F(W) comprises three types of region as illustrated in FIG. 4A, FIG. 4B, and FIG. 4C. Then the gradient descent algorithm can be effective in solving the following optimization problem, which is a simplified version of (P1) without its unitary/orthogonal constraint:

$$(P2) \min_W F(W),$$

if the descent process can avoid being trapped at saddle points. An approach of escaping from a saddle point is to add artificial noise into the gradients. Then the column space of the optimal point, W*, solves Problem (P1).

As a special case of FL, the iterative algorithm of distributed PCA can be based on SGD. To describe the algorithm, consider an arbitrary communication round of the algorithm. At its beginning, the server broadcasts the current principal components W to all devices for computing gradients based on all local data samples. To this end, the local objective function of device k is given as $$F_k(W) = \frac{1}{l_0}\sum_{i\in\mathcal{D}_k}\left\|x_i - WW^T x_i\right\|_2^2.$$

Moreover, define the data covariance matrix at device k as $R_k=X_k X_k^T$, where the $D \times \ell_0$ matrix $X_k$ comprises samples in the local dataset $D_k$. Then the local gradient, $F_k(W)$, is computed at device k as:

$$\nabla F_k(W) = \frac{1}{\ell_0}\left[-2R_k + R_k WW^T + WW^T R_k\right]W. \qquad (8)$$

The devices upload their local gradients to the server for aggregation and then updating the principal components W. Note that the gradient of the global objective function F(W) can be written in terms of local gradients as:

$$\nabla F(W) = \frac{1}{K} \sum_{k=1}^{K} \nabla F_k(W). \tag{9}$$

However, the received gradient is purposely perturbed by noise to escape from saddle points:

$$\nabla \hat{F}(W) = \frac{1}{K} \sum_{k=1}^{K} \nabla F_k(W) + z, \tag{10}$$

where z is a random vector representing noise. Then the principal components in the current round (say round n), $W_n$, are updated by the server:

$$W_{n+1} = W_n - \mu \nabla \hat{F}(W_n) \tag{11}$$

where μ is a fixed step-size. The above per-round procedure is repeated until W converges.

3) AirPCA Implementation: AirPCA can implement distributed PCA in an over-the-air aggregation system. The implementation of the n-th round is described as follows. To facilitate transmission over both in phase and quadrature channels, the local and global gradients (matrices), $\nabla F_k(W)$ and $\nabla F(W)$, are complex vectorized with mapping functions $g_k(.)$ and $g(.)$, where the resultants are denoted as $g_k(W) = \text{vec}[\nabla F_k(W)]$ and $g(W) = \text{vec}[\nabla F(W)]$, each comprising $$c = \frac{D \times d}{2}$$

elements. Given i.i.d. data distribution over devices, the following assumption of unbiased estimation is common in the literature of distributed learning and estimation.

Assumption 1 (Unbiased Estimation): The local gradient computed at each device can be assumed to be an unbiased estimate of the global gradient:

$$g_k(W) = g(W) + \Delta_k, \quad 1 \le k \le K, \tag{12}$$

where the estimation error vector, $\Delta_k$ is called data noise and satisfies:

$$E[\Delta_k] = \frac{1}{K} \sum_{k=1}^{K} \Delta_k = 0, \quad E[\Delta_k \Delta_k^H] \le k^2 I, \tag{13}$$

for a given constant $k^2$. Note that the data noise $\{\Delta_k\}$ at different devices are correlated.

To realize over-the-air aggregation, each device transmits its local gradient using linear analog modulation. Following a model for i.i.d. data distribution, the symbols at device k, namely the elements of the local gradient $g_k(W)$, can be modeled as identically distributed random variables with mean η and variance $v^2$; the statistics are identical for all devices and are known by them. To facilitate power control in (2), each symbol that is not truncated is normalized to have zero mean and unit variance, i.e., $$s_{k,n} = \frac{g_k(W_n - \eta)}{v}$$

in the n-th round, and then transmitted over a sub-channel; otherwise, a symbol 0 is transmitted. Being synchronized in time (using i.e., timing advance in 3GPP) and using truncated channel inversion in (3), all devices simultaneously transmit their OFDM symbols with aligned boundaries to perform over the air aggregation. This yields the symbol vector as received by the server as:

$$y_n = \sum_{k=1}^{K} \sqrt{P_n^{TX}} s_{k,n} + Z_n \tag{14}$$

Then the received symbols are de-normalized to give the elements of the noisy global gradient, denoted as $\hat{g}(W_n)$, as:

$$[\hat{g}(W_n)]_i = \frac{1}{K_n^{(i)}} \frac{v}{\sqrt{P_n^{rx}}} [y_n]_i + \eta, \tag{15}$$

where $K_n^{(i)}$ is defined to be the number of devices transmitting the i-th gradient element in the n-th round, with $K_n^{(i)}$ denoting the set of devices, that is, $|K_n^{(i)}| = K_n^{(i)}$. The number follows a binomial distribution, $K_n^{(i)} \sim B(K; \zeta^{act})$, with fact being the activation probability in equation (5). Equation (15) implies that $K_n^{(i)}$ is nonzero. This is reasonable since $\Pr(K)_n^{(i)} = 0) = (1 - \zeta^{act})^K$, which is close to zero when $\zeta^{act}$ is close to one and/or K is large. The substitution of the normalization equation and (14) into (15) gives the noisy global gradient as received by the server as:

$$\hat{g}_k(W_n) = g(W_n) + \xi_n, \tag{16}$$

where the noise vector $\xi_n$ combines channel and data noise and is defined element-wise as:

$$[\xi_n]_i = \frac{1}{K_n^{(i)}} \left( \frac{v}{\sqrt{P_n^{rx}}} [Z_n]_i + \sum_{k \in K_n^{(i)}} [\Delta_k]_i \right), \quad 1 \le i \le M. \tag{17}$$

By de-vectorizing $\hat{g}_k(W_n)$ in equation (16) into the matrix $\hat{F}(W_n)$, the principal components are updated as in equation (11), completing the n-th round of AirPCA.

Convergence Analysis for AirPCA

In this section, the convergence of AirPCA is quantified in terms of descent speeds in different types of regions and convergence accuracy. The results are useful for designing power control. FIGS. 4A, 4B, and 4C illustrate three example types of regions, in accordance with one or more embodiments described herein. FIG. 4A illustrates an example a non-stationary region type. FIG. 4A illustrates an example saddle region type. FIG. 4C illustrates an example optimum region type.

A. Definitions and Assumptions

For tractable analysis, several definitions and assumptions are given as follows. First, as discussed, the objective function F(W) of the PCA problem in (P1) contains discrete saddle points, one global optimum without local optimums. Such a function belongs to the family of strict saddle functions defined as follows.

Definition 1 (Strict Saddle Function). A twice-differentiable function F(W) is called (α, ϒ, ϵ, δ)-strict saddle if for any point W, at least one of the following is true: 1. $\|\nabla F(W)\| \ge \epsilon$. 2. Consider the Hessian matrix $\mathcal{H}(W) = \nabla^2 F(W)$. Its minimum eigenvalue $\lambda_{min}(\mathcal{H}(W)) \le -\gamma$ for some positive constant ϒ. 3. Let W* be the point of global minimum of F(W) and δ and α given positive constants. In the $\delta$-neighborhood $\{W \in \mathbb{R}^{D \times d} : \|W - W^*\| \leq \delta\}$, the function $F(W)$ is $\alpha$-strongly convex, i.e., $\lambda_{min}(\mathcal{H}(W)) \geq \alpha$.

The above definition allows the three types of regions of $F(W)$ as illustrated in FIGS. 4A, 4B, and 4C to be defined mathematically as follows.

Definition 2 (Region Types). A region of $F(W)$ belongs to one of the following three types.

A non-stationary region [see FIG. 4A], denoted as $\mathcal{R}_{ns}$, is one where condition 1) holds and thus can be defined as $\mathcal{R}_{ns} = \{W \in \mathbb{R}^{D \times d} : \|\nabla F(W)\| \geq \epsilon\}$.

A saddle region [see FIG. 4B], denoted as $\mathcal{R}_{sa}$, is one where both conditions 1) and 2) hold and thus can be defined as $\mathcal{R}_{sa} = \{W \in \mathbb{R}^{D \times d} : \|\nabla F(W)\| < \epsilon; \lambda_{min}(\mathcal{H}(W)) \leq -\gamma\}$.

A global optimum region [see FIG. 4C], denoted as $R_{op}$, is one where condition 3) holds and thus can be defined as $$\mathcal{R}_{op} = \{W \in \mathbb{R}^{D \times d} : \|W - w^*\| \leq \delta; \lambda_{min}(\mathcal{H}(W) \geq \alpha\}.$$

For tractability, several assumptions on $F(W)$ can be made that introduce additional properties that usually hold in practice.

Assumption 2. The function $F(W)$ has several additional properties:

1) (Boundedness) Both the function $F(W)$ and its gradient norm are bounded: $\|F(W)\| \leq B$ and $\|g(W)\| \leq C'$ for all $W$ and some constants B and C.

2) (Smoothness) The function $F(W)$ is $\beta$-Lipschitz smooth:

$$\|g(W_1) - g(W_2)\| \leq \beta \|W_1 - W_2\| \quad (18)$$

for some positive constant $\beta$.

3) (Hessian smoothness) The Hessian of $F(W)$, $\mathcal{H}(W) = \nabla^2 F(W)$ is X-Lipschitz smooth:

$$\|\mathcal{H}(W_1) - \mathcal{H}(W_2)\| \leq \chi \|W_1 - W_2\|, \quad (19)$$

for some positive constant X.

B. Characterizing Gradient Descent in Different Regions

1) Descent in non-stationary regions: The descent speed is measured by the expected reduction on the error function, termed the expected error reduction, over a given number of rounds. The descent speed in a non-stationary region is related to the receive signal power as well as other parameters as follows.

Theorem 1 (Descent Speed in a Non-Stationary Region). Consider n-round gradient descent in a non-stationary region, $\mathcal{R}_{ns}$, with the corresponding principal-component states $\{W_0, \ldots, W_{n-1}\} \subset \mathcal{R}_{ns}$ and receive power controlled to be $\{P_0^{rx}, \ldots, P_{n-1}^{rx}\}$. If the step-size $\mu \leq 1/\beta$ with $\beta$ specifying the error-function smoothness, the expected error reduction over the n rounds can be lower bounded as:

$$E[F(W_0) - F(W_n)] \geq \eta \mu \left[ \frac{\epsilon^2}{2} - \frac{\beta c \mu k^2}{K \zeta^{act}} - \frac{3 \beta c \mu v^2 \sigma^2}{(K \zeta^{act})^2 \overline{P}^{rx}} \right], \quad (20)$$

$$\text{where } \overline{P}^{rx} = \left[ \frac{1}{n} \sum_{m=0}^{n-1} \frac{1}{P_m^{rx}} \right].$$

First of all, one can observe from equation (20) that the expected error reduction is proportional to nu, the order of descent distance. Next, the three terms enclosed by the brackets at the right-hand side of equation (20) quantify the effects of the slopes of the error function, data noise, and channel noise respectively, which are explained as follows. The first term is proportional to the square of the minimum slope, $\epsilon^2$, of the error function in $\mathcal{R}_{ns}$. Being negative, the second term reduces the descent speed by an amount proportional to the data-noise variance, $k^2$, and inversely proportional to the expected number of devices performing over-the-air aggregation, namely $K\zeta^{act}$. The latter scaling law results from more accurate distributed estimation due to a larger global dataset where there are more devices.

The last term on the channel-noise effect is new in the literature of distributed PCA. One can observe that the descent speed reduction due to channel noise is inversely proportional to $$\frac{\overline{P}^{rx}}{\sigma^2},$$

which can be interpreted as the expected receive SNR per device. This is obvious in the case of fixed receive power, $\overline{P}_m^{rx} = P_0^{rx}$, for all m for which $$\frac{\overline{P}^{rx}}{\sigma^2}$$

reduces to $$\frac{P_0^{rx}}{\sigma^2}.$$

On the other hand, over-the-air aggregation results in the expected magnitude of the aggregated signal at the server increasing linearly with respect to the expected number of devices, $K\zeta^{act}$. Consequently, the expected SNR after aggregation is scaled up by $(K\zeta^{act})^2$, causing the channel-noise term in equation (20) to decrease as an inverse function of the factor. In addition, as a sanity check, setting the channel noise variance $\sigma^2 = 0$ and the activation probability $\zeta^{act}t = 1$, the result in Theorem 1 converges to the existing one assuming reliable channels. This also applies to Theorems 2 and 3.

Based on the result in Theorem 1, we can draw the conclusion that it is desirable to suppress the effect of channel noise by increasing the effective receive signal power, namely $\overline{P}^{rx}$. In particular, given a power sequence $\{P_0^{rx}, \ldots, P_n^{rx}\}$, if another sequence $\{\dot{P}_0^{rx}, \ldots, \dot{P}_n^{rx}\}$ is larger than $\{P_m^{rx}\}$ elementwise, then $\{\dot{P}_m^{rx}\}$ leads to larger expected reduction on the error function over the n rounds.

2) Descent in saddle regions: The descent speed in a saddle region is related to the receive signal power as well as other parameters as follows:

Theorem 2 (Descent Speed in a Saddle Region). Consider n-round gradient descent in a saddle region, $\mathcal{R}_{sa}$, with the corresponding principal-component states $\{W_0, \ldots, W_{n-1}\} \subset \mathcal{R}_{sa}$ and finite receive power $P_0^{rx}, \ldots, P_{n-1}^{rx}\} \subset [P_{min}^{rx}, P_{max}^{rx}]$. Define two constants $$v_{max} = \frac{k^2}{K \zeta^{act}} + \frac{3 v^2 \sigma^2}{K^2 \zeta^{act2} P_{min}^{rx}} \text{ and } v_{min} = \frac{v^2 \sigma^2}{K^2 P_{max}^{rx}}.$$

If the step-size and number of rounds satisfy $$\mu \ll \frac{1}{cv_{max}}, \; n > \frac{1}{2\mu\gamma} \log\left(6c\frac{v_{max}}{v_{min}} + 1\right) = N_{max}, \quad (21)$$

the expected error reduction over the n rounds can be lower bounded as $$E[F(W_0) - F(W_n)] \geq \quad (22)$$

$$\frac{\mu}{4}\left[\frac{k^2}{K\zeta^{act}} + \mu\gamma \sum_{m=0}^{n-N_{max}-1} \frac{(1+\mu\gamma)^{2(n-m-1)}v^2\sigma^2}{K^2 P_m^{rx}} + \frac{3v^2\sigma^2}{K^2\zeta^{act2}P_{min}^{rx}}\right]$$

In a saddle region [see FIG. 4B], the gradient descent may be infeasible in some dimensions (e.g., one in which the error function is convex and the current point is the minimum); descent is guaranteed only in the dimension corresponding to the minimum eigenvalue $\lambda_{min}(\mathcal{H}(W)) \leq -\gamma$ which is concave. The result in Theorem 2 shows that the gradient perturbation by the data-and-channel noise has the beneficial effect of warranting the expected descent (or equivalently strictly positive expected error reduction) if the step-size is sufficiently small and the number of rounds is sufficiently large. This results in a high probability of descending in the dimension corresponding to $\lambda_{min}(\mathcal{H}(W))$ due to the noise induced randomization of the descending direction. In the brackets at the right-hand side of equation (22), the first term and the last two terms represent the positive effects of data and channel noise on the descent speed, respectively, as opposed to their negative effects in a non-stationary region (see Theorem 1).

An observation important for power control that can be made from equation (22) is that enhancing the channel noise by reducing the receive signal power, $\{P_m^{rx}\}$, enhances the expected error reduction. Thus, it is desirable to set the power to its minimum, $P_m^{rx} = P_{min}^{rx}$. As a result, the bound on the expected error reduction can be simplified as:

$$E[F(W_0) - F(W_n)] \geq \frac{\mu}{4}\left[\frac{k^2}{K\zeta^{act}} + \left(\phi(\mu, n) + \frac{3}{(\zeta^{act})^2}\right)\frac{v^2\sigma^2}{K^2 P_{min}^{rx}}\right]. \quad (23)$$

$$\text{where } \phi(\mu, n) = \frac{(1+\mu\gamma)^{2n} - (1+\mu\gamma)^{2N_{max}}}{2 + \mu\gamma}.$$

On the other hand, it should be emphasized that the receive signal power should not be too low as too strong noise can make the aggregated gradient (or equivalently the descent direction) completely random and thereby make it impossible to truly escape from a saddle point in the long term, namely repeatedly returning to the point.

3) Convergence likelihood and accuracy: The results in Theorems 1 and 2 show that the gradient descent of AirPCA is not trapped in any non-stationary or saddle region. Consequently, the descent path eventually enters the optimum region almost surely, leading to learning convergence. The likelihood of convergence can be mathematically characterized in the following theorem, where the constants $V_{max}$ and $N_{max}$ follow those defined in Theorem 2.

Theorem 3. Consider N-round gradient descent for Air-PCA from an arbitrary initial point and a step-size $\mu$ satisfying $$\mu \ll \frac{1}{cv_{max}} \text{ and } \mu < \frac{\epsilon^2}{4\beta cv_{max}}. \text{ Let } \mathcal{E}_N$$

denote the event that the descent path enters the optimum region within N rounds: $\mathcal{E}_N = \{$There exists some n such that $0 \leq n \leq N-1$ and $W_n \in \mathcal{R}op^\bullet\}$. If $N = mN_{max}$ with $m \in IN^+$, the probability of $\mathcal{E}_N$ can be lower bounded as:

$$Pr(\mathcal{E}_N) \geq 1 - \frac{12B}{(m+1)\mu p v_{max}} \quad (24)$$

where the constant $$\rho = \min\left\{\frac{2\beta c}{\gamma}\log\left(6c\frac{v_{max}}{v_{min}} + 1\right), 1\right\},$$

and $\beta$ is the upper-bound on the error-function norm.

Theorem 3 shows that if the step-size $\mu$ is sufficient small and the number of rounds is sufficiently large, the convergence is guaranteed in probability by ensuring $Pr(\mathcal{E}_N)$ close to one. Although it is possible for the descent path to escape from the optimum region due to accidental strong noise, it will return to $\mathcal{R}_{op}$ almost surely according to Theorem 3.

A standard analytical method for SGD can be applied to characterize the convergence accuracy. For instance, it can be shown that if the number of rounds is sufficiently large, the distance between the learned principal components, $W_n$, and the optimal point $W^*$, namely $\|W_n - W^*\|^2$, is linearly proportional to $\mu q\sqrt{E[\|\xi\|^2]}$ where $\xi$ is the data-plus-channel noise sample in equation (16).

Region-Adaptive Power Control

Building on the convergence analysis in the preceding section, the scheme of region-adaptive power control to accelerate AirPCA is designed in this section. The scheme comprises of two component schemes, online detection of descent regions and online power control. They are described sequentially in the following subsections.

A. Online Detection of Descent Regions

Online detection of the type of the current descent region is the key for realizing the proposed scheme of region-adaptive power control. The main challenge lies in detecting a saddle region due to the conflict. Consider an arbitrary round, say the n-th round. On one hand, it follows from the region's definition that its type can be detected by estimating the minimum eigenvalue of the Hessian matrix, namely $\lambda_{min}(\mathcal{H}(W))$, and evaluating its value against some given negative constant $-\Upsilon$. If a saddle region is detected, channel noise should be enhanced so that the descent path can escape from being trapped at the saddle point. On the other hand, the estimation of the Hessian matrix $H(W_n)$ is difficult. Specifically, at best the server has the knowledge of one descent path that provides only partial knowledge of $H(W_n)$ but the full knowledge is required for computing its eigenvalues. Due to the difficulty of detecting a saddle region based on its definition, we propose a simple and effective online detection scheme described as follows. Again, consider the n-th round where the norm of the aggregated gradient $\|\hat{g}(W_n)\|$ is found to be below a given threshold $\epsilon$ while that in the preceding round is above $\epsilon$. This indicates the descent path is entering a region which is either a saddle or an optimum region. By default, the region is detected as a saddle region and then the receive signal power is reduced to amplify the noise effect for the path to escape from a saddle point. Given a decreased SNR, the gradient descent is continued for $N_0$ rounds where $N_0$ is a design parameter. Then the resultant expected error reduction over $N_0$ rounds, namely $[F(W_{n-N_0})-F(W_n)]$, is evaluated against a positive threshold $f_0$. If the detection of a saddle region is correct, the escape from the saddle point should lead to substantial error reduction according to Theorem 2 and thus $[F(W_{n-N_0})-F(W_n)]\geq f_0$. Otherwise, the detection is incorrect and the region should be the optimum region. Assuming that the decreased SNR is not too low so that the descent path remains within the region after No rounds, the power control is adapted to the optimum region to reduce noise to ensure a small error after convergence. Last, the detection of a non-stationary region is straightforward and the criterion is $\|\hat{g}(W_n)\|\geq\epsilon$.

The scheme of online descent-region detection is summarized in Algorithm 1, below.

---

Algorithm 1: Online Descent-Region Detection

---

Input: Error reduction threshold $f_0$ and testing round number $N_0$.
Output: Region detection $\theta_n$.
Initialize n = 0, $\theta_n = \mathcal{R}_{ns}$;
While not converge do
{
Calculate $\|\hat{g}(W_n)\|$;
if $\|\hat{g}(W_n)\| < \epsilon$ and $\theta_n = \mathcal{R}_{op}$ then
{
Detect $\theta_{n+1} = \mathcal{R}_{op}$;
Reduce noise and continue one round;
Set n = n + 1;
}
else if $\|\hat{g}(W_n)\| < \epsilon$ and $\theta_n \neq \mathcal{R}_{op}$ then
{
Detect $\theta_{n+1}, \ldots, \theta_{n+N_0} = \mathcal{R}_{sa}$ by default;
Continue $N_0$ rounds;
Set n = n + $N_0$;
Calculate $[F(W_{n-N_0}) - F(W_n)]$ by aggregation
if $[F(W_{n-N_0}) - F(W_n)] < f_0$ then
    {
    Detect $\theta_n = \mathcal{R}_{op}$;
    }
}
else
    {
    Detect $\theta_n = \mathcal{R}_{ns}$;
    Continue one round;
    Set n = n + 1;
    }
}

---

B. Online Power Control

Building on the preceding scheme of online region detection, the principle of region-adaptive power control is to reduce receive signal power when the descent path enters a saddle region but increase the power if the path enters a non-stationary or optimum region. The former helps the path escape from a saddle point using channel noise (see Theorem 2) while the latter overcomes the noise to approach the steepest descent (see Theorem 1).

Consider the case where a saddle region, $\mathcal{R}_{sa}$, is detected. Then truncated channel inversion in equation (3) is controlled by each device so that the receive signal power is fixed at a chosen parameter $P_{min}^{rx}$ throughout the sojourn in $\mathcal{R}_{sa}$. Mathematically, $P_n^{rx}=P_{min}^{rx}$ for all $W_n\in\mathcal{R}_{sa}$. The parameter $P_{min}^{rx}$ should be chosen carefully, e.g., using experiments in the sequel. As discussed, though $P_{min}^{rx}$ should be sufficiently low so as to exploit the noise effect, its being too low can jeopardize finding the right descent path. Under the average power constraint in equation (4), it is necessary to choose $P_{min}^{rx}$ to be smaller than the maximum average receive power $P_{max}^{rx}$, which saves power for use in other types of regions. Let $N_{sa}$ denote the number of rounds for descent within $\mathcal{R}_{sa}$. Then the power saving is given as $N_{sa}(\overline{P}_{max}^{rx}-P_{min}^{rx})$.

Next, consider where either a non-stationary or optimum region is detected, denoted as $\mathcal{R}_{ns/op}$. The power-control policy is identical for both types of regions. Its key feature is to spend the accumulated power saving on accelerating the descent in the current region. Let $n_0, n_1, \ldots, n_{N-1}$ denote the rounds within $\mathcal{R}_{ns/op}$ with N representing the total number of rounds. The accumulated saving can be written as $P_{save}^{rx}=\Sigma_{m=0}^{n_0-1}(\overline{P}_{max}^{rx}-P_{min}^{rx})$. We propose that the receive signal power in the current region is controlled as $P_n^{rx}=\overline{P}_{max}^{rx}+\alpha_n P_{save}^{rx}$ for $n_0\leq n\leq n_{N-1}$. The coefficients $\{a_n\}\subset[0,1]$ are called power-spending coefficients and can be set using one of the following two designs.

1) One-shot power-saving spending: All of the accumulated power saving is used in the first round upon the descent path entering $\mathcal{R}_{ns/op}$, namely $a_{n0}=1$ and $a_n=0$ for n= $n_1, \ldots, n_{N-1}$. In other words, $P_{n_0}^{rx}=\overline{P}_{max}^{rx}+P_{save}^{rx}$ and $P_n^{rx}=\overline{P}_{max}^{rx}$ for $n=n_1, \ldots, n_{N-1}$.

2) Gradual power-saving spending: The accumulated power saving is spent over all rounds following $a_{n_j}=(1-q)q^j$ for $0\leq j\leq N-1$ with $q\in(0,1)$. Since $\Sigma_{n=n_0}^{nN-1}a_{n_j}\leq 1$, all of the accumulated power saving is spent in $\mathcal{R}_{ns/op}$ if N is large or q is close to zero. Otherwise only part of the saving is used and the remaining is kept for subsequent regions along the descent path.

Last, it should be emphasized that the above scheme for online power control guarantees that the average power constraint is satisfied. Moreover, the computation complexity of the power control scheme is $\mathcal{O}(Dd)$ for each round.

Example Results

FIGS. 5-8 illustrate example results that can optionally be achieved using some embodiments of this disclosure. FIGS. 5A and 5B illustrate the usefulness of channel noise for AirPCA to escape from saddle points. FIGS. 6A and 6B illustrate learning performance comparisons using different datasets. FIGS. 7A and 7B illustrate the effects of power-spending coefficients on the learning performance of AirPCA with region-adaptive power control. FIGS. 8A and 8B illustrate the effect of the number of devices and the truncation threshold on the learning performance of AirPCA with region-adaptive power control. FIGS. 5-8 show example results based on various training datasets, including a Modified National Institute of Standards and Technology (MNIST) dataset, a Canadian Institute for Advanced Research, 10 classes (CIFAR-10) dataset, and an AR dataset (a database of face images).

Figure 5A:
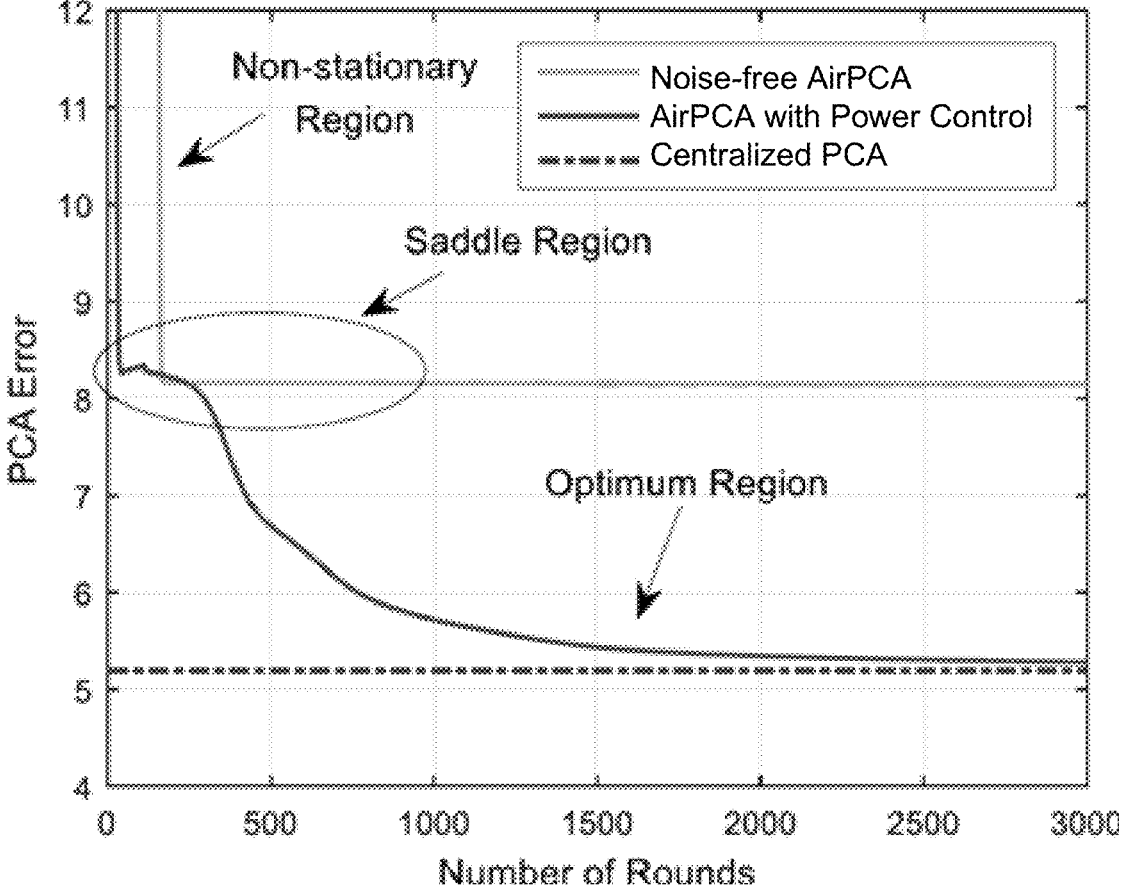
FIG. 5A is a graph which provides an example comparison of noise-free AirPCA, AirPCA with power control, and centralized PCA, in accordance with one or more embodiments described herein.
Figure 5B:
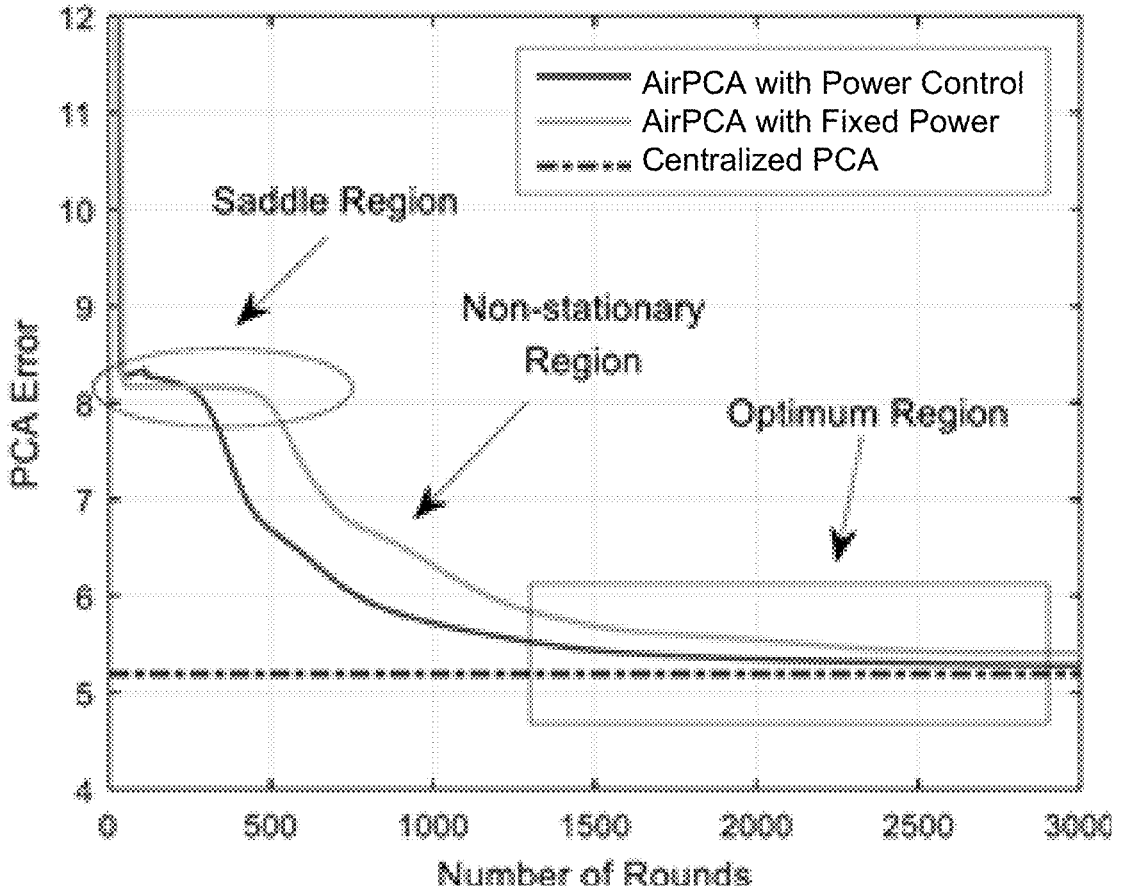
FIG. 5B is a graph which provides an example comparison of AirPCA with power control, AirPCA with fixed power, and centralized PCA, in accordance with one or more embodiments described herein.

With reference to FIGS. 5A and 5B, the usefulness of channel noise for AirPCA to escape from saddle points can be observed by comparing AirPCA with region adaptive power control, noise-free AirPCA, and AirPCA with fixed power. The MNIST dataset is used. To demonstrate the benefit of channel noise, the curves of PCA error versus number of rounds are plotted in FIG. 5A for AirPCA with channel noise and region-adaptive power control (labeled as "AirPCA with Power Control") and Air-PCA without channel noise (labeled as "Noise-free AirPCA"). The curve for centralized PCA is also plotted for comparison. The learned principal components of AirPCA with noise are observed to converge to those of centralized PCA after about 2000 rounds while those in the noise-free case fail to do so. The reason is that the (gradient) descent path of the former escapes from the saddle point with the help of channel noise while that of the latter is trapped at the point.

Next, the learning performance of AirPCA with region-adaptive power control, AirPCA with fixed power, and centralized PCA are compared in FIG. 5B, where the curves of PCA error versus number of rounds are plotted. One can observe that the proposed power-control scheme effectively accelerates the convergence with respect to the case with fixed power. For instance, to achieve the PCA error 7% (i.e., error of 5.6) above the level of centralized PCA (i.e., error of 5.2), the learning latency is about 1170 rounds compared with 1740 rounds for AirPCA with fixed power, namely 33% reduction in learning latency.

Figure 6A:
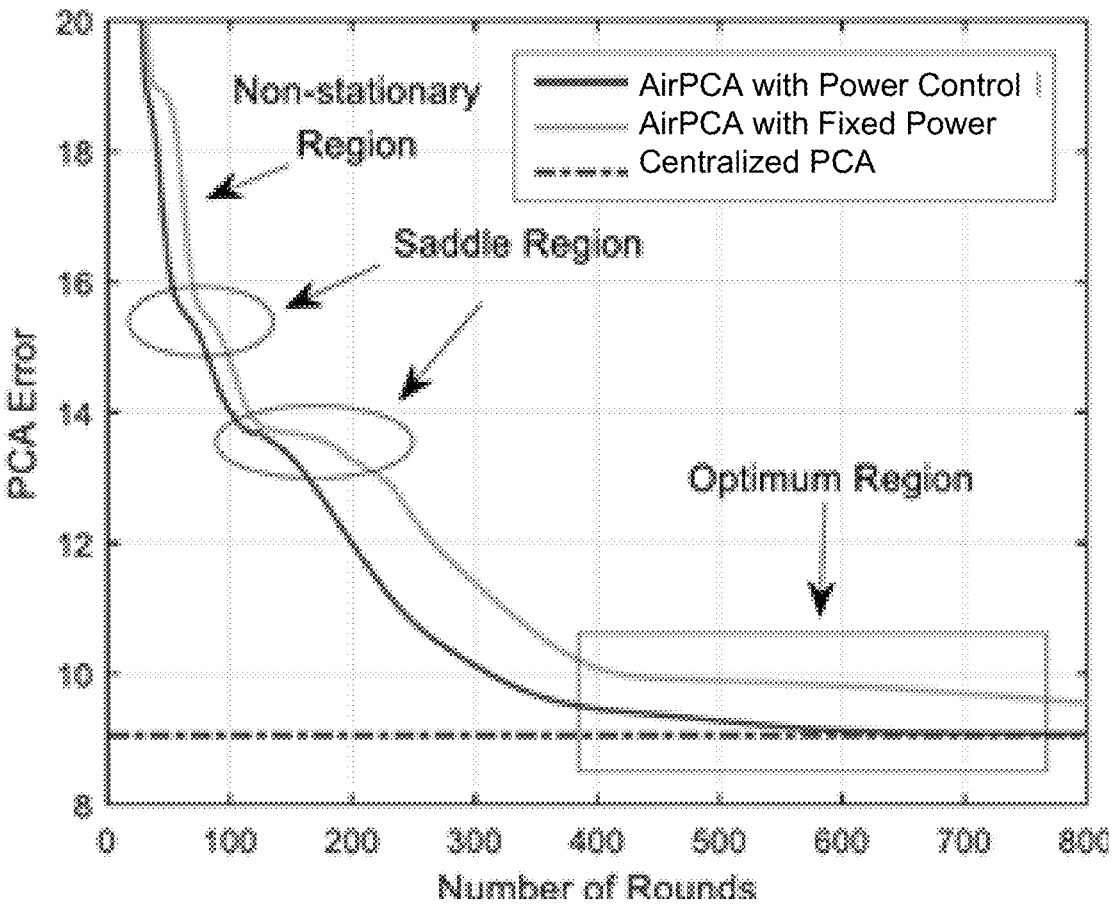
FIG. 6A is a first graph which provides an example first learning performance comparison using a first dataset.
Figure 6B:
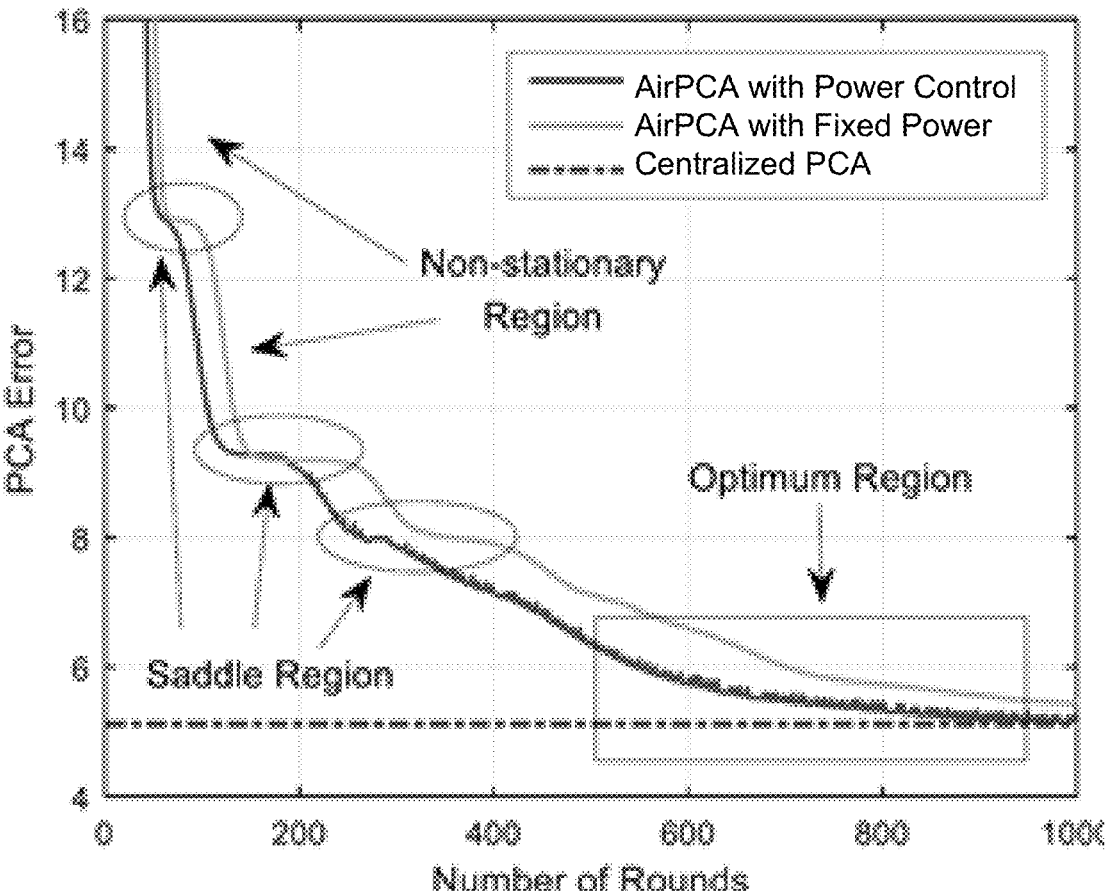
FIG. 6B is a graph which provides an example second learning performance comparison using a second dataset.

Furthermore, the learning performance is also compared using two other datasets, CIFAR-10 and AR, in FIGS. 6A and 6B. As in the last comparison, one can make the same observation that region adaptive power control accelerates convergence. Last, it is worth mentioning that the initial part of the descent process for MNIST (see FIG. 5A, 5B) is relatively abrupt as compared with those for the other datasets (see FIG. 6A, 6B). The reason is that the data samples in MNIST are black-and-white images of handwritten letters for which the data information is more concentrated in the subspace of principal components than that of CIFAR-10 and AR, composed of colorful and gray-scale images, respectively. In general, the descent speed depends on the power distribution of the components, which varies with respect to different datasets.

Figure 7A:
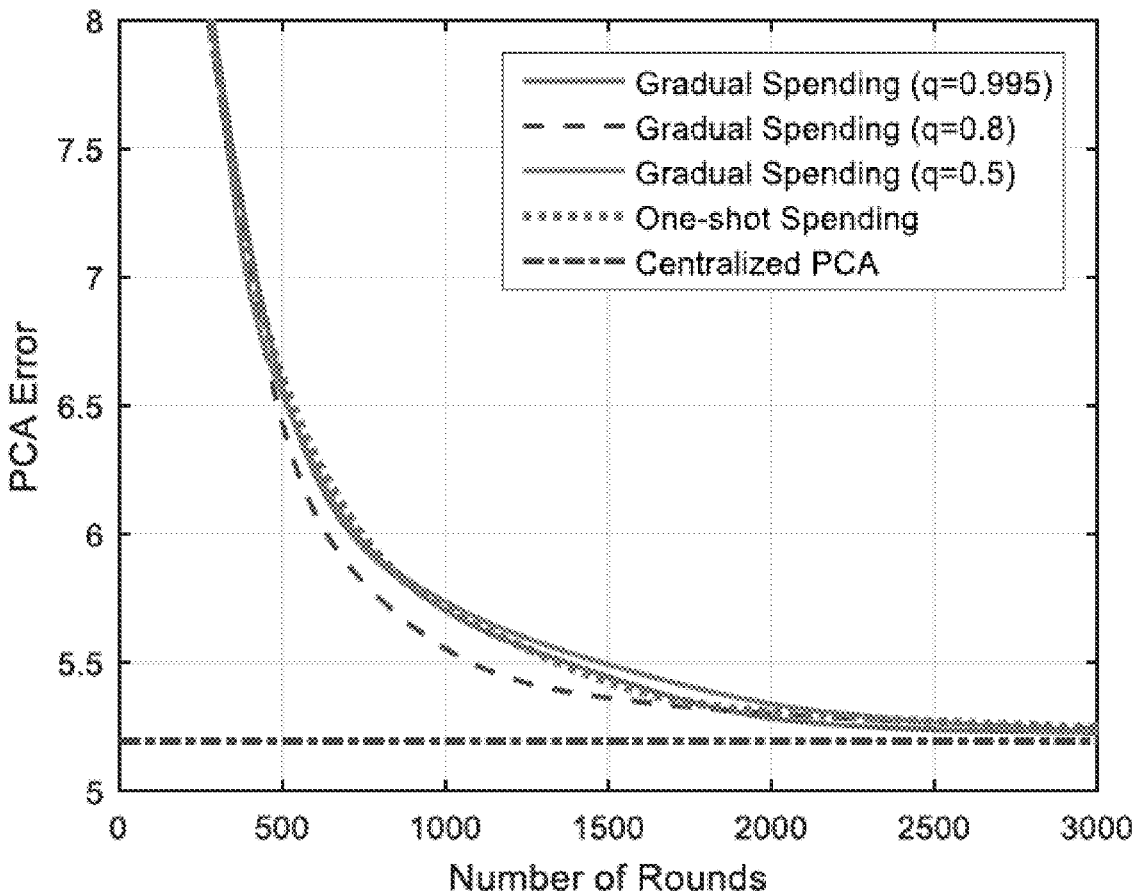
FIG. 7A is a first graph which illustrates an example effect of power-spending coefficients on the learning performance of AirPCA with region-adaptive power control.
Figure 7B:
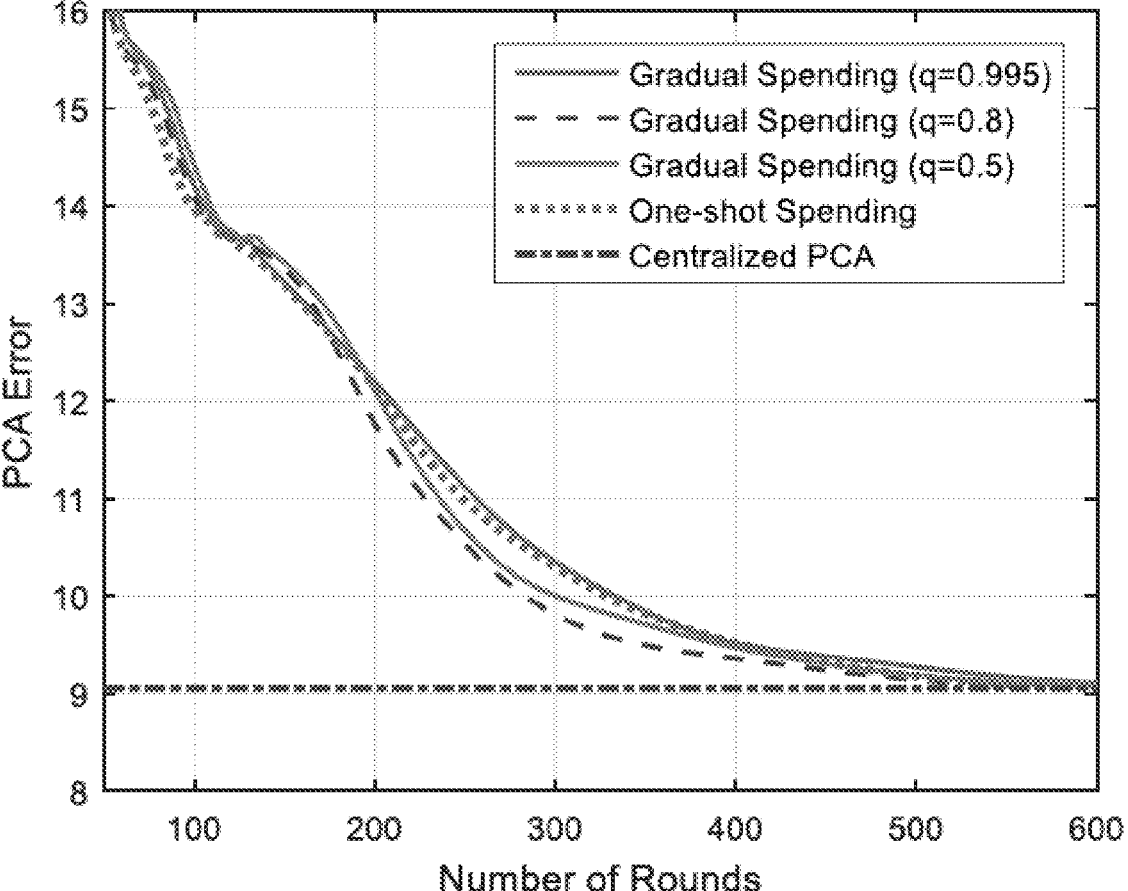
FIG. 7B is a second graph which illustrates an example effect of power-spending coefficients on the learning performance of AirPCA with region-adaptive power control.

With reference to FIGS. 7A and 7B, two designs of power spending coefficients are illustrated, namely one-shot (FIG. 7A) and gradual power (FIG. 7B) saving spending, in the proposed scheme of region-adaptive power control in terms of their effects on the learning performance. Both the MNIST and CIFAR-10 datasets are used and the descent step-sizes are set as $\mu=0.005$ and $\mu=0.02$, respectively. One can see that gradual spending of power-saving in the non-stationary and optimum regions with an optimized parameter (i.e., $q=0.8$) achieves faster convergence than the one-shot schemes or gradual schemes with alternative values for q (e.g., 0.5 or 0.995). It can be observed that their different effects on the convergence lie in the stationary and optimum regions but not in the saddle regions where signal power is unaffected by the power-spending coefficients. Furthermore, the convergence accuracies are unaffected.

Figure 8A:
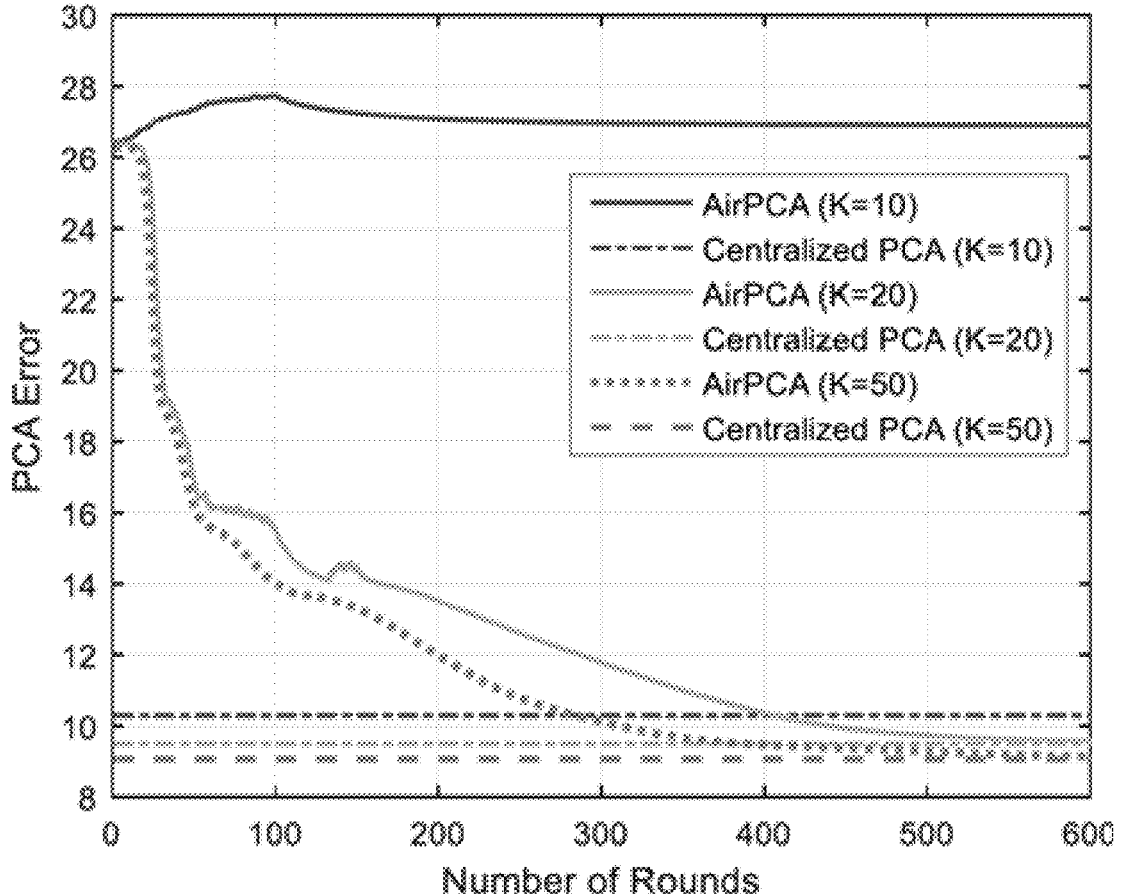
FIG. 8A is a graph which illustrates an example effect of the number of devices on the learning performance of AirPCA with region-adaptive power control.
Figure 8B:
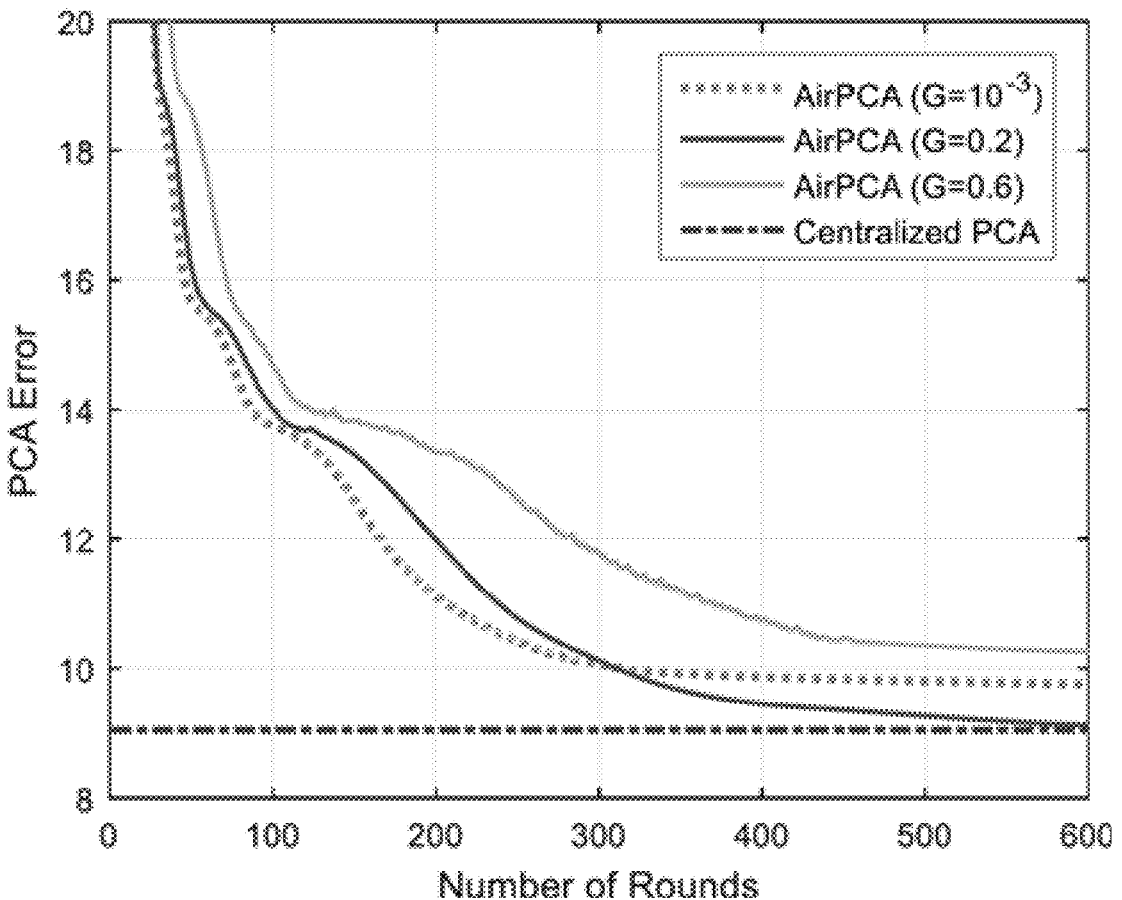
FIG. 8B is a graph which illustrates an example effect of the truncation threshold on the learning performance of AirPCA with region-adaptive power control.

FIGS. 8A and 8B illustrate effects of other system parameters. FIG. 8A illustrates the effect of the number of devices on the learning performance of AirPCA with region-adaptive power control. FIG. 8B illustrates the effect of the truncation threshold on the learning performance of AirPCA with region-adaptive power control.

Considering AirPCA with region-adaptive power control, the curves of PCA error versus number of rounds are plotted in FIG. 8A for a varying number of devices, $K=\{10; 20; 50\}$. Each device is provided with 10 data samples randomly drawn from the dataset. Thus, the total data used in AirPCA/centralized-PCA are proportional to the number of devices. We take the CIFAR-10 dataset for experiment with step-size 0.02. For $K=\{20; 50\}$, the learning performance is better for larger number of devices. On the other hand, when the number is small (e.g., $K=10$), SGD-based AirPCA fails to converge due to the joint effect of limited data and insufficient aggregation gain that suppresses channel noise [see equation (17)]. In contrast, centralized PCA using SVD does not encounter such a problem. One possible solution to prevent the divergence is to reduce the step-size in AirPCA at the cost of slowing down the convergence.

Next, we investigate the effect of channel-truncation threshold in equation (3), G, on the learning performance of Air-PCA with region-adaptive power control. To this end, the curves of PCA error versus number of rounds are plotted in FIG. 8B for a varying value of the truncation threshold $G=\{0:001; 0:2; 0:5\}$ for the CIFAR-10 dataset. Note that G controls the expected ratio of truncated sub-channels. One can see that setting G too small or too large can result in divergence. The former is due to too small receive signal power under the constraint of magnitude alignment across active subchannels for over-the-air aggregation [see equation (3)]; the latter is due to too many truncated sub-channels that severely distort the uploaded local gradients. This suggests the need of optimizing G in some embodiments.

FIG. 9 is a flow diagram representing example operations of a device that participates in a federated principal components analysis, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 9 can be performed, for example, by a device such as device 101 illustrated in FIG. 1. Device 101 can comprise a first device in a group of other devices such as 102, 103. Example operation 902 comprises receiving, by a first device 101, an updated matrix from a server 110, wherein the first device 101 is a participant in a federated principal components analysis. Example operation 904 comprises determining, by the first device 101, a local gradient with respect to the updated matrix, wherein the local gradient is based on local data stored at the first device 101. Example operation 906 comprises modulating, by the first device 101, the local gradient using linear analog modulation, resulting in a modulated local gradient. Example operation 908 comprises adjusting, by the first device 101, a transmission power, resulting in an adjusted transmission power. Example operation 910 comprises receiving, by the first device 101, synchronization information to synchronize a first wireless signal with a second wireless signal. Example operation 912 comprises sending, by the first device 101, the modulated local gradient to the server 110 via the first wireless signal, wherein the first wireless signal comprises the adjusted transmission power, and wherein the first wireless signal is synchronized with the second wireless signal sent by a second device, e.g., by device 102.

In some embodiments according to FIG. 9, adjusting the transmission power at operation 908 comprises decreasing the transmission power, e.g., in response to detection of a potential saddle region at the server 110. Decreasing the transmission power can be performed in order to increase noise in the first wireless signal and thereby enable escape from the potential saddle region detected at the server 110. Adjusting the transmission power at operation 908 can further comprise increasing the transmission power in order to use power that was previously saved by decreasing the transmission power, as disclosed herein.

In some embodiments according to FIG. 9 the illustrated method can be performed in multiple repeating cycles. The method can be repeated to enable a determination, at the server 110, of a lower-dimensional subspace that contains information from higher-dimensional data including the local data stored at the first device 101 and other local data stored at other devices 102, 103.

In some embodiments according to FIG. 9 the operations can allow participating, by a device 101 of multiple devices 101, 102, 103, in a federated principal components analysis, wherein the federated principal components analysis comprises multiple communication rounds, and wherein each communication round of the multiple communication rounds comprises a simultaneous wireless transmission from the multiple devices 101, 102, 103 to a server 110. The operations of each communication round can further comprise receiving an updated matrix from the server 110, determining a local gradient with respect to the updated matrix, wherein the local gradient is based on local data stored at the device 101, modulating the local gradient using linear analog modulation, resulting in a modulated local gradient, adjusting a transmission power, resulting in an adjusted transmission power, and simultaneously wirelessly transmitting the modulated local gradient to the server 110 via a wireless signal, wherein the wireless signal comprises the adjusted transmission power, and wherein the wireless signal is simultaneous with multiple wireless signals sent by the multiple devices 101, 102, 103.

FIG. 10 is a flow diagram representing example operations of a server that participates in a federated principal components analysis, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 10 can be performed, for example, by a server such as edge server 110 illustrated in FIG. 1. Example operation 1002 comprises receiving an aggregated signal comprising a global gradient. The global gradient comprises a combination of respective local gradients calculated at respective devices 101, 102, 103, wherein the respective local gradients are concurrently wirelessly transmitted by the respective devices 101, 102, 103 for over the air combination of the respective local gradients to form the aggregated signal.

Example operation 1004 comprises updating a matrix based on the global gradient, resulting in an updated matrix. Example operation 1006 comprises determining a region type associated with the global gradient, e.g., non-stationary, saddle, or optimal.

Example operation 1008 comprises determining, based on the region type, a power adjustment for application by the respective devices 101, 102, 103. The power adjustment can comprise, e.g., a decrease of transmission power for application by the respective devices 101, 102, 103. The decrease of the transmission power is in response to the region type comprising a potential saddle region. The decrease of the transmission power can effectuate an increase in noise included in wireless transmissions by the respective devices 101, 102, 103, wherein the increase in noise enables escape from the potential saddle region. Alternatively, the power adjustment can comprise, e.g., an increase of the transmission power in order to enable use by the respective devices 101, 102, 103 of power that was previously saved by the decrease of the transmission power.

Example operation 1010 comprises sending the updated matrix, the power adjustment, and synchronization information to the respective devices 101, 102, 103. The synchronization information can synchronize concurrent wireless transmissions of the respective local gradients by the respective devices 101, 102, 103.

As with FIG. 9, the operations of FIG. 10 can be performed in multiple repeating cycles according to a defined frequency. The method can be repeated to enable PCA calculations, e.g., calculation of a lower-dimensional subspace that contains information from higher-dimensional data including respective local data stored at the respective devices 101, 102, 103.

Figure 11:
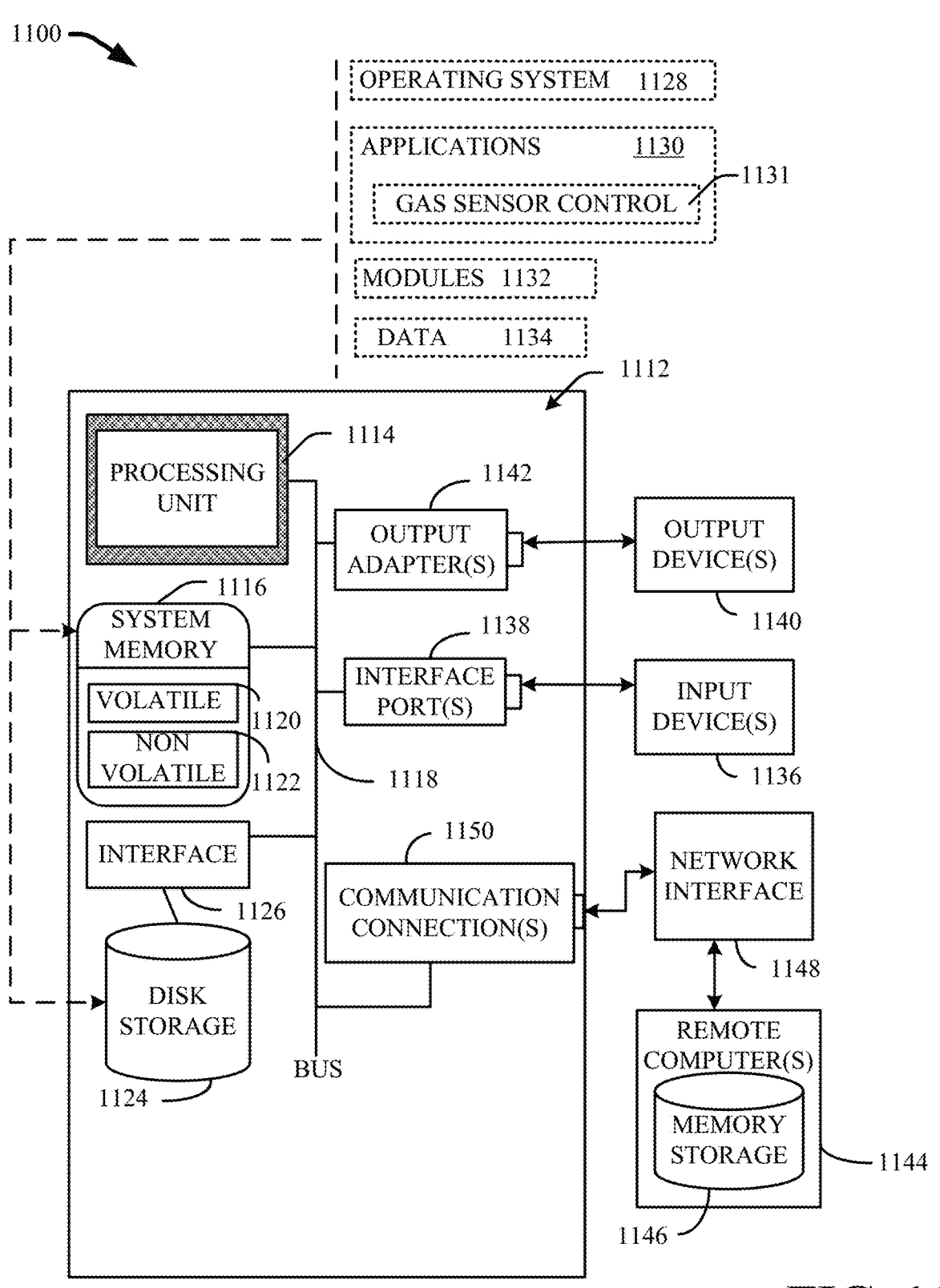
FIG. 11 is an example computing device that can implement any of the various devices referenced herein, in accordance with one or more embodiments described herein.

In order to provide a context for the various aspects of the disclosed subject matter, FIG. 11 and the following discussion, are intended to provide a brief, general description of a suitable environment in which the various aspects of the disclosed subject matter can be implemented. While subject matter has been described herein in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1120, non-volatile memory 1122, disk storage 1124, solid-state memory devices, and memory storage 1146. Further, non-volatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 11 illustrates a block diagram of a computing system 1100, e.g., configured to operate as a controller 818, and operable to execute the disclosed systems and methods in accordance with an embodiment. Computer 1112, which can be, for example, part of the hardware of system 1100, includes a processing unit 1114, a system memory 1116, and a system bus 1118. System bus 1118 couples system components including, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1494), and Small Computer Systems Interface (SCSI).

System memory 1116 can include volatile memory 1120 and nonvolatile memory 1122. A basic input/output system (BIOS), containing routines to transfer information between elements within computer 1112, such as during start-up, can be stored in nonvolatile memory 1122. By way of illustration, and not limitation, nonvolatile memory 1122 can include ROM, PROM, EPROM, EEPROM, or flash memory. Volatile memory 1120 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 can also include removable/non-removable, volatile/non-volatile computer storage media. FIG. 11 illustrates, for example, disk storage 1124. Disk storage 1124 includes, but is not limited to, devices like a magnetic disk drive, floppy disk drive, tape drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to system bus 1118, a removable or non-removable interface is typically used, such as interface 1126.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 11 describes software that acts as an intermediary between users and computer resources described in suitable operating environment 1100. Such software includes an operating system 1128. Operating system 1128, which can be stored on disk storage 1124, acts to control and allocate resources of computer system 1112. It is to be noted that the disclosed subject matter can be implemented with various operating systems or combinations of operating systems.

System applications 1130 take advantage of the management of resources by operating system 1128 through program modules 1132 and program data 1134 stored either in system memory 1116 or on disk storage 1124. In some embodiments, a gas sensor control application 1131 may control operations described in connection with FIG. 11 in order to perform gas sensor measurements and to identify gasses or gas concentrations under measurement. Gas sensor control application 1131 can control measurements using the components of the gas sensitive FET array, as described herein, and can record measurement data as data 1134.

A user can enter commands or information into computer 1112 through input device(s) 1136, including via fingertip pointing as described herein. As an example, a mobile device and/or a portable device can include a user interface embodied in a touch sensitive display panel allowing a user to interact with computer 1112. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1114 through system bus 1118 by way of interface port(s) 1138. Interface port(s) 1138 include, for example, a serial port, a parallel port, a game port, a universal serial bus (USB), an infrared port, a Bluetooth port, an IP port, or a logical port associated with a wireless service, etc. Output device(s) 1140 use some of the same type of ports as input device(s) 1136.

Thus, for example, a USB port can be used to provide input to computer 1112 and to output information from computer 1112 to an output device 1140. Output adapter 1142 is provided to illustrate that there are some output devices 1140 like monitors, speakers, and printers, among other output devices 1140, which use special adapters. Output adapters 1142 include, by way of illustration and not limitation, video and sound cards that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, cloud storage, cloud service, a workstation, a microprocessor based appliance, a peer device, or other common network node and the like, and typically includes many or all of the elements described relative to computer 1112.

For purposes of brevity, only a memory storage device 1146 is illustrated with remote computer(s) 1144. Remote computer(s) 1144 is logically connected to computer 1112 through a network interface 1148 and then physically connected by way of communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Accordingly, the invention is not to be limited to any single implementation, but rather is to be construed in breadth, spirit and scope in accordance with the appended claims.

What is claimed is:

1. A method, comprising:

receiving, by a first device comprising at least one processor, an updated matrix from a server, wherein the first device is a participant in a federated principal components analysis;

determining, by the first device, a local gradient with respect to the updated matrix, wherein the local gradient is based on local data stored at the first device;

modulating, by the first device, the local gradient using linear analog modulation, resulting in a modulated local gradient;

adjusting, by the first device, a transmission power, resulting in an adjusted transmission power, wherein the adjusting is performed according to a defined region-adaptive control process that:

decreases transmission power in response to determining that a descent region detected at the server comprises a saddle region, or increases transmission power in response to determining that the descent region comprises a non-stationary region or a defined optimum region; and sending, by the first device, the modulated local gradient to the server via a first wireless signal, wherein the first wireless signal comprises the adjusted transmission power, and wherein the first wireless signal is synchronized with a second wireless signal sent by a second device.

2. The method of claim 1, wherein decreasing the transmission power is performed in order to increase noise in the first wireless signal and thereby enable escape from the saddle region detected at the server.

3. The method of claim 1, wherein increasing the transmission power comprises increasing the transmission power in order to use power that was previously saved by decreasing the transmission power.

4. The method of claim 1, wherein the method is performed in multiple repeating cycles.

5. The method of claim 1, wherein the method is repeated to enable a determination, at the server, of a lower-dimensional subspace that contains information from higher-dimensional data including the local data stored at the first device and other local data stored at other devices.

6. The method of claim 1, further comprising receiving, by the first device, synchronization information to synchronize the first wireless signal with the second wireless signal.

7. The method of claim 1, wherein adjusting the transmission power according to the defined region-adaptive control process further comprises performing at least one of a defined one-shot power-spending process in which saved power is used in a single subsequent round, or a defined gradual power-spending process in which saved power is distributed across multiple rounds.

8. Server equipment configured to participate in a federated principal components analysis, the server equipment comprising:

at least one processor; and at least one memory that stores executable instructions that, when executed by the at least one processor, facilitate performance of operations, comprising:

receiving an aggregated signal comprising a global gradient, wherein the global gradient comprises a combination of respective local gradients calculated at respective devices, wherein the respective local gradients are concurrently wirelessly transmitted by the respective devices for over the air combination of the respective local gradients to form the aggregated signal;

updating a matrix based on the global gradient, resulting in an updated matrix;

determining a region type associated with the global gradient;

determining whether the region type comprises a saddle region, a non-stationary region, or a defined optimum region;

determining, based on the region type, a power adjustment for application by the respective devices, wherein the power adjustment comprises:

reducing transmission power in response to the region type being determined to correspond to the saddle region, or increasing transmission power in response to the region type being determined to correspond to the non-stationary region or the defined optimum region; and sending the updated matrix and control information identifying the power adjustment and the power adjustment to the respective devices.

9. The server equipment of claim 8, wherein the decrease of the transmission power effectuates an increase in noise included in wireless transmissions by the respective devices, and wherein the increase in noise enables escape from the saddle region.

10. The server equipment of claim 8, wherein increasing the transmission power comprises an increase of the transmission power in order to enable use by the respective devices of power that was previously saved by the decrease of the transmission power.

11. The server equipment of claim 8, wherein the operations are is performed in multiple repeating cycles according to a defined frequency.

12. The server equipment of claim 8, wherein the operations are repeated to enable calculation of a lower-dimensional subspace that contains information from higher-dimensional data including respective local data stored at the respective devices.

13. The server equipment of claim 8, wherein the operations further comprise sending synchronization information to synchronize concurrent wireless transmissions of the respective local gradients by the respective devices.

14. A non-transitory machine-readable medium, comprising executable instructions that, when executed by at least one processor, facilitate performance of operations, comprising:

participating, by a device of multiple devices, in a federated principal components analysis, wherein the federated principal components analysis comprises multiple communication rounds, wherein each communication round of the multiple communication rounds comprises a simultaneous wireless transmission from the multiple devices to a server, and wherein the operations of each communication round further comprise:

receiving an updated matrix from the server;

determining a local gradient with respect to the updated matrix, wherein the local gradient is based on local data stored at the device;

modulating the local gradient using linear analog modulation, resulting in a modulated local gradient;

adjusting a transmission power, resulting in an adjusted transmission power, wherein the adjusting is performed according to a defined region-adaptive control process that:

reduces transmission power when a descent region detected at the server is determined to comprise a potential saddle region, or increases transmission power when the descent region is determined to comprise a non-stationary region or a defined optimum region; and concurrently wirelessly transmitting the modulated local gradient to the server via a wireless signal, wherein the wireless signal comprises the adjusted transmission power, and wherein the wireless signal is simultaneous with multiple wireless signals sent by the multiple devices.

15. The non-transitory machine-readable medium of claim 14, wherein the transmission power is reduced in order to increase noise in the wireless signal and thereby enable avoidance of the potential saddle region detected at the server.

16. The non-transitory machine-readable medium of claim 14, wherein the transmission power is increased in order to use power that was previously saved by decreasing the transmission power.

17. The non-transitory machine-readable medium of claim 14, wherein the federated principal components analysis enables a determination, at the server, of a lower-dimensional subspace that contains information from higher-dimensional data including local data stored at the multiple devices.

18. The non-transitory machine-readable medium of claim 14, wherein the operations are performed in multiple repeating cycles according to a defined frequency.

19. The non-transitory machine-readable medium of claim 14, wherein the wireless signal is synchronized with another wireless signal of the with multiple wireless signals.

20. The non-transitory machine-readable medium of claim 14, wherein adjusting the transmission power according to the defined region-adaptive control process further comprises performing at least one of a defined one-shot power-spending process in which saved power is used in a single subsequent round, or a defined gradual power-spending process in which saved power is distributed across multiple rounds.

\* \* \* \* \*